United States Patent
Yao

(10) Patent No.: US 8,345,238 B2
(45) Date of Patent: Jan. 1, 2013

(54) MEASURING OPTICAL SPECTRAL PROPERTY OF LIGHT BASED ON POLARIZATION ANALYSIS

(75) Inventor: Xiaotian Steve Yao, Diamond Bar, CA (US)

(73) Assignee: General Photonics Corporation, Chino, CA (US)

( * ) Notice: Subject to any disclaimer, the term of this patent is extended or adjusted under 35 U.S.C. 154(b) by 826 days.

(21) Appl. No.: 12/351,294

(22) Filed: Jan. 9, 2009

(65) Prior Publication Data

US 2009/0207409 A1  Aug. 20, 2009

Related U.S. Application Data

(60) Provisional application No. 61/025,933, filed on Feb. 4, 2008.

(51) Int. Cl.
*G01J 4/00* (2006.01)
(52) U.S. Cl. ........................................ 356/364
(58) Field of Classification Search ................. None
See application file for complete search history.

(56) References Cited

U.S. PATENT DOCUMENTS

| | | |
|---|---|---|
| 3,302,028 A | 1/1967 | Sterzer |
| 3,684,350 A | 8/1972 | Wentz |
| 3,719,414 A | 3/1973 | Wentz |
| 4,461,543 A | 7/1984 | McMahon |
| 4,798,436 A | 1/1989 | Mortimore |
| 5,251,057 A | 10/1993 | Guerin et al. |
| 5,301,101 A | 4/1994 | MacArthur et al. |
| 5,317,445 A | 5/1994 | DeJule et al. |
| 5,373,393 A | 12/1994 | DeJule et al. |
| 5,381,250 A | 1/1995 | Meadows |
| 5,475,525 A | 12/1995 | Tournois et al. |
| 5,561,726 A | 10/1996 | Yao |
| 5,723,856 A | 3/1998 | Yao et al. |
| 5,751,747 A | 5/1998 | Lutes et al. |
| 5,777,778 A | 7/1998 | Yao |
| 5,796,510 A | 8/1998 | Yao |
| 5,894,362 A | 4/1999 | Onaka et al. |
| 5,917,179 A | 6/1999 | Yao |
| 5,929,430 A | 7/1999 | Yao et al. |
| 5,978,125 A | 11/1999 | Yao |

(Continued)

OTHER PUBLICATIONS

Davis, M.A., et al., "Application of a Fiber Fourier Transform Spectrometer to the Detection of Wavelength-Encoded Signals from Bragg Grating Sensors," *Journal of Lightwave Technology*, 13(7):1289-1295, Jul. 1995.

(Continued)

*Primary Examiner* — Gordon Stock, Jr.
(74) *Attorney, Agent, or Firm* — Perkins Coie LLP

(57) ABSTRACT

A device for measuring spectrum of light includes a differential group delay (DGD) device positioned to receive light under measurement and to produce output light with a DGD value representing a difference in the group delay between two orthogonal optical polarizations of the light under measurement. An optical detector is positioned to receive the output light from the DGD device to measure a state and a degree of polarization of the output light. A processing device receives and processes measurements of the state and the degree of polarization from the optical detector. A probe light source produces probe light. An optical sensor receives the probe light and interacts with the probe light at a resonance wavelength of the optical sensor. A processing unit processes the optical spectrum of the returned probe light to extract information on a parameter to change the resonance wavelength.

12 Claims, 17 Drawing Sheets

U.S. PATENT DOCUMENTS

| | | | |
|---|---|---|---|
| 6,104,492 A | 8/2000 | Giles et al. | |
| 6,178,036 B1 | 1/2001 | Yao | |
| 6,229,599 B1 * | 5/2001 | Galtarossa | 356/73.1 |
| 6,246,818 B1 | 6/2001 | Fukushima | |
| 6,339,405 B1 | 1/2002 | Gleener | |
| 6,351,323 B1 | 2/2002 | Onaka et al. | |
| 6,389,197 B1 | 5/2002 | Ilchenko et al. | |
| 6,417,957 B1 | 7/2002 | Yao | |
| 6,417,965 B1 | 7/2002 | Ye et al. | |
| 6,473,218 B1 | 10/2002 | Maleki et al. | |
| 6,476,959 B2 | 11/2002 | Yao | |
| 6,480,637 B1 | 11/2002 | Yao | |
| 6,487,233 B2 | 11/2002 | Maleki et al. | |
| 6,487,336 B1 | 11/2002 | Yao | |
| 6,488,861 B2 | 12/2002 | Iltchenko et al. | |
| 6,493,474 B1 | 12/2002 | Yao | |
| 6,498,869 B1 | 12/2002 | Yao | |
| 6,535,328 B2 | 3/2003 | Yao | |
| 6,546,159 B1 * | 4/2003 | Peng et al. | 385/11 |
| 6,567,436 B1 | 5/2003 | Yao et al. | |
| 6,576,886 B1 | 6/2003 | Yao | |
| 6,580,532 B1 | 6/2003 | Yao et al. | |
| 6,583,900 B2 | 6/2003 | Onaka et al. | |
| 6,594,061 B2 | 7/2003 | Huang et al. | |
| 6,628,850 B1 | 9/2003 | Yao | |
| 6,628,861 B1 | 9/2003 | Yao | |
| 6,628,862 B1 | 9/2003 | Yao | |
| 6,661,941 B1 | 12/2003 | Yao | |
| 6,687,423 B1 | 2/2004 | Yao | |
| 6,724,526 B1 | 4/2004 | Onaka et al. | |
| 6,754,404 B2 | 6/2004 | Yao | |
| 6,765,670 B2 * | 7/2004 | Olsson et al. | 356/327 |
| 6,765,723 B1 * | 7/2004 | Savory | 359/489.05 |
| 6,785,042 B1 | 8/2004 | Onaka et al. | |
| 6,795,481 B2 | 9/2004 | Maleki et al. | |
| 6,795,616 B2 | 9/2004 | Yao | |
| 6,836,327 B1 | 12/2004 | Yao | |
| 6,842,283 B2 * | 1/2005 | Savory et al. | 359/489.05 |
| 6,873,631 B2 | 3/2005 | Yao et al. | |
| 6,873,783 B1 | 3/2005 | Yao | |
| RE38,735 E | 5/2005 | Yao | |
| 6,937,798 B1 | 8/2005 | Yao et al. | |
| RE38,809 E | 10/2005 | Yao | |
| 6,975,454 B1 | 12/2005 | Yan et al. | |
| 7,027,198 B2 | 4/2006 | Yao | |
| 7,067,795 B1 | 6/2006 | Yan et al. | |
| 7,154,659 B1 | 12/2006 | Yao et al. | |
| 7,157,687 B1 | 1/2007 | Yao | |
| 7,190,850 B2 * | 3/2007 | Mimura et al. | 385/11 |
| 7,218,436 B2 | 5/2007 | Yao | |
| 7,227,686 B1 | 6/2007 | Yan et al. | |
| 7,233,720 B2 | 6/2007 | Yao | |
| 7,265,836 B1 | 9/2007 | Yao | |
| 7,265,837 B1 | 9/2007 | Yao | |
| 7,343,100 B2 | 3/2008 | Yao | |
| 7,372,568 B1 | 5/2008 | Yao | |
| 7,382,962 B1 | 6/2008 | Yao | |
| 7,391,977 B2 | 6/2008 | Yao | |
| 7,436,569 B2 | 10/2008 | Yao et al. | |
| 7,466,471 B2 | 12/2008 | Yao | |
| 7,495,765 B2 * | 2/2009 | Peupelmann et al. | 356/364 |
| 7,522,785 B2 | 4/2009 | Yao | |
| 7,534,990 B2 | 5/2009 | Yao | |
| 7,535,639 B2 | 5/2009 | Yao et al. | |
| 7,693,419 B1 | 4/2010 | Chen et al. | |
| 2002/0101633 A1 | 8/2002 | Onaka et al. | |
| 2003/0081874 A1 | 5/2003 | Yao | |
| 2003/0095736 A1 | 5/2003 | Kish, Jr. et al. | |
| 2004/0037495 A1 | 2/2004 | Yao | |
| 2004/0252999 A1 | 12/2004 | Onaka et al. | |
| 2005/0013330 A1 | 1/2005 | Kish, Jr. et al. | |
| 2005/0013331 A1 | 1/2005 | Kish, Jr. et al. | |
| 2005/0013332 A1 | 1/2005 | Kish, Jr. et al. | |
| 2005/0018178 A1 | 1/2005 | Schloss et al. | |
| 2005/0018720 A1 | 1/2005 | Kish, Jr. et al. | |
| 2005/0018721 A1 | 1/2005 | Kish, Jr. et al. | |
| 2005/0041922 A1 | 2/2005 | Yao | |
| 2005/0168659 A1 | 8/2005 | Melton | |
| 2005/0200941 A1 | 9/2005 | Yao | |
| 2005/0201751 A1 | 9/2005 | Yao | |
| 2005/0265728 A1 | 12/2005 | Yao | |
| 2006/0012764 A1 | 1/2006 | Kawashima et al. | |
| 2006/0023987 A1 | 2/2006 | Yao | |
| 2006/0110090 A1 | 5/2006 | Ellwood, Jr. | |
| 2006/0115199 A1 | 6/2006 | Yao | |
| 2007/0223078 A1 | 9/2007 | Yao et al. | |
| 2007/0297054 A1 | 12/2007 | Yao et al. | |
| 2008/0030839 A1 | 2/2008 | Yao | |
| 2008/0054160 A1 | 3/2008 | Yao | |
| 2008/0138070 A1 | 6/2008 | Yan et al. | |
| 2008/0159692 A1 | 7/2008 | Yao | |
| 2009/0028565 A1 | 1/2009 | Yao | |
| 2009/0213453 A1 | 8/2009 | Yao | |
| 2009/0225420 A1 | 9/2009 | Yao et al. | |
| 2009/0238218 A1 | 9/2009 | Yao | |

OTHER PUBLICATIONS

Kersey, A.D., et al., "Polarisation-Insensitive Fibre Optic Michelson Interferometer," *Electronics Letters*, 27(6):518-520, Mar. 1991.

Sobiski, D., et al., "Fast first-order PMD compensation with low insertion loss for 10Gbit/s system," *Electronics Letters*, 37(1):46-48, Jan. 2001.

Yan, L.S., et al., "Programmable Group-Delay Module using Binary Polarization Switching," *IEEE Journal of Lightwave Technology*, 21(7):1676-1684, Jul. 2003.

\* cited by examiner

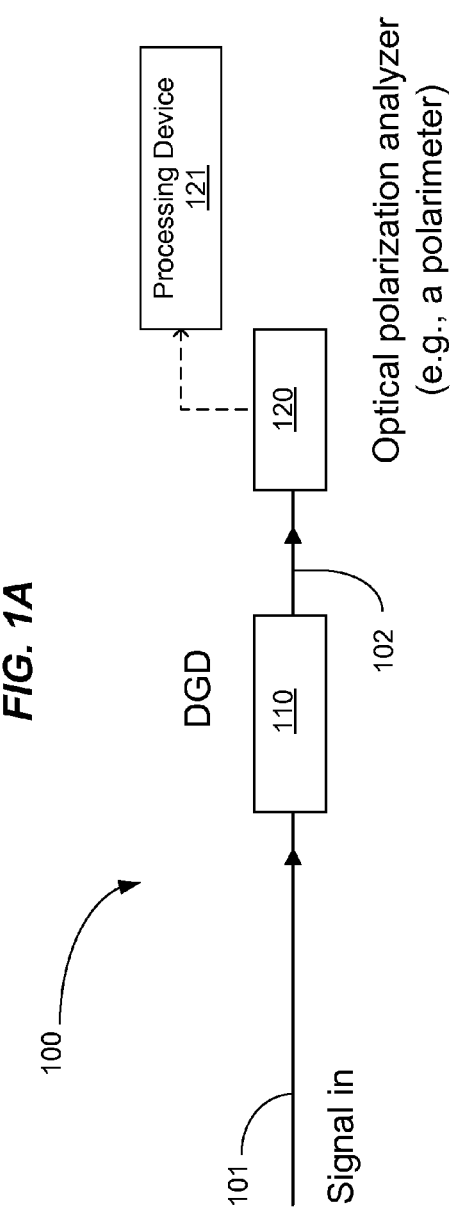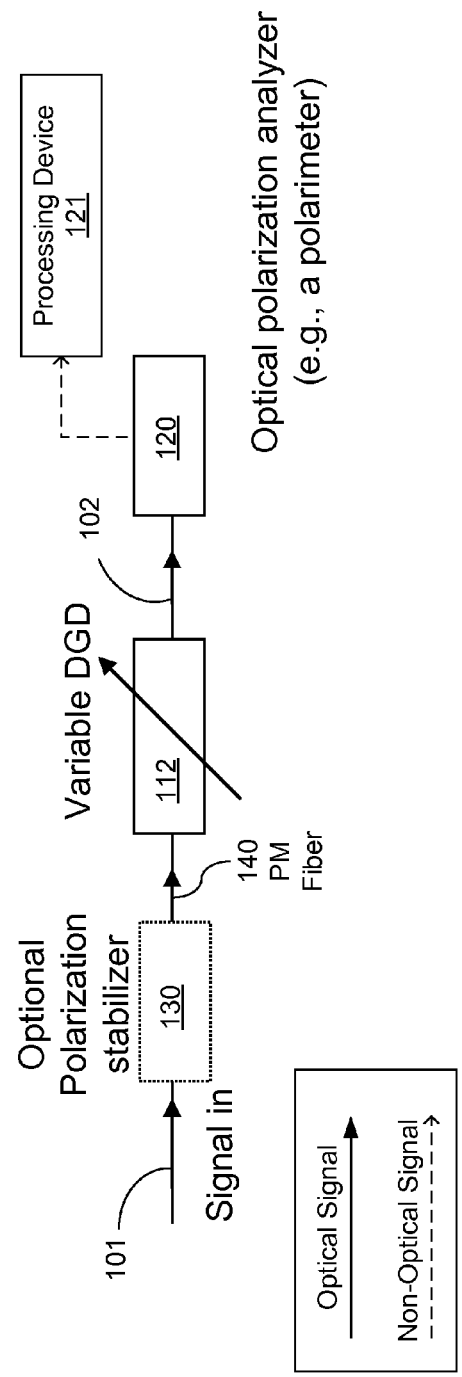

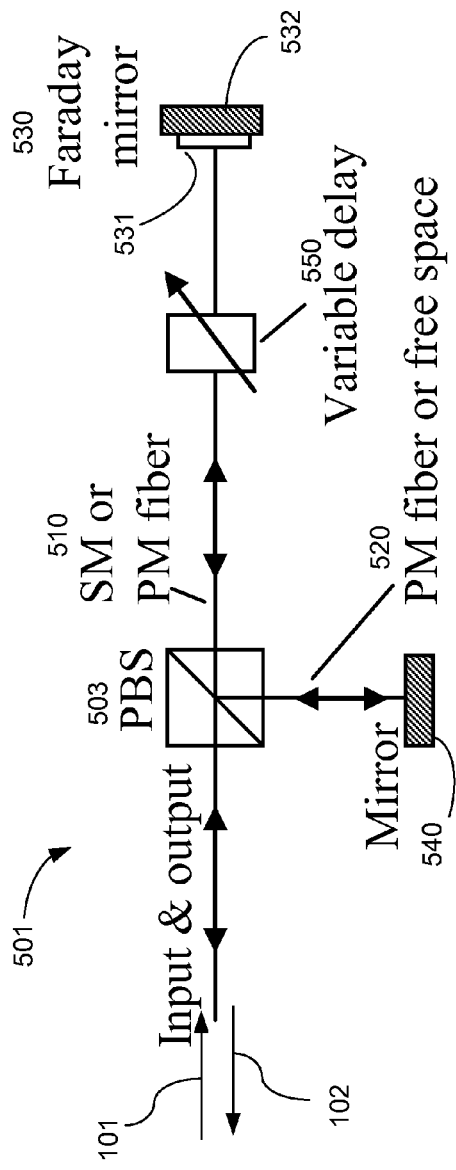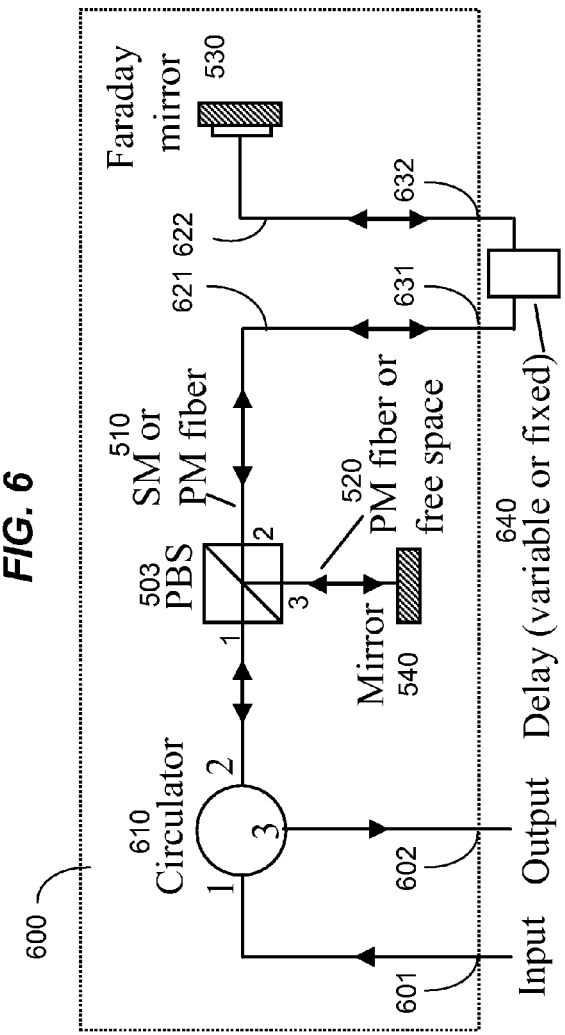

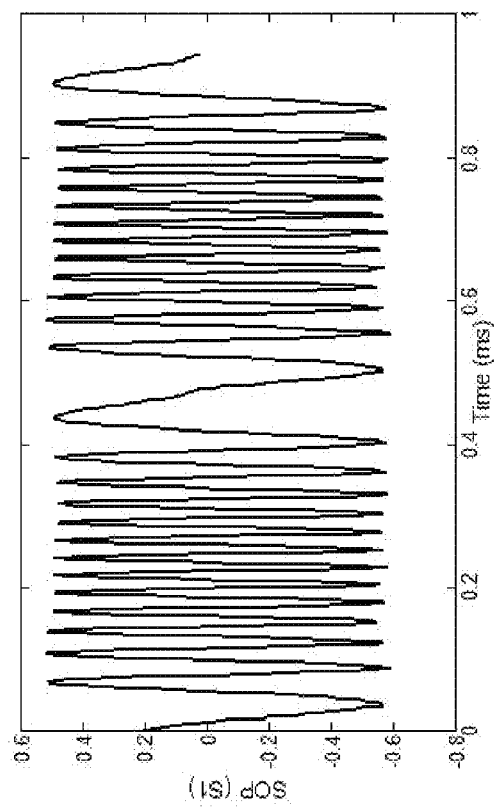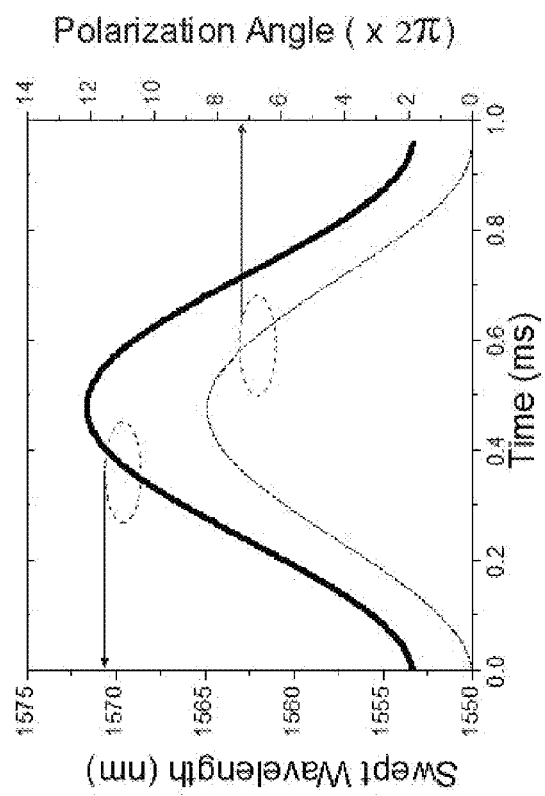
FIG. 7A
FIG. 7B

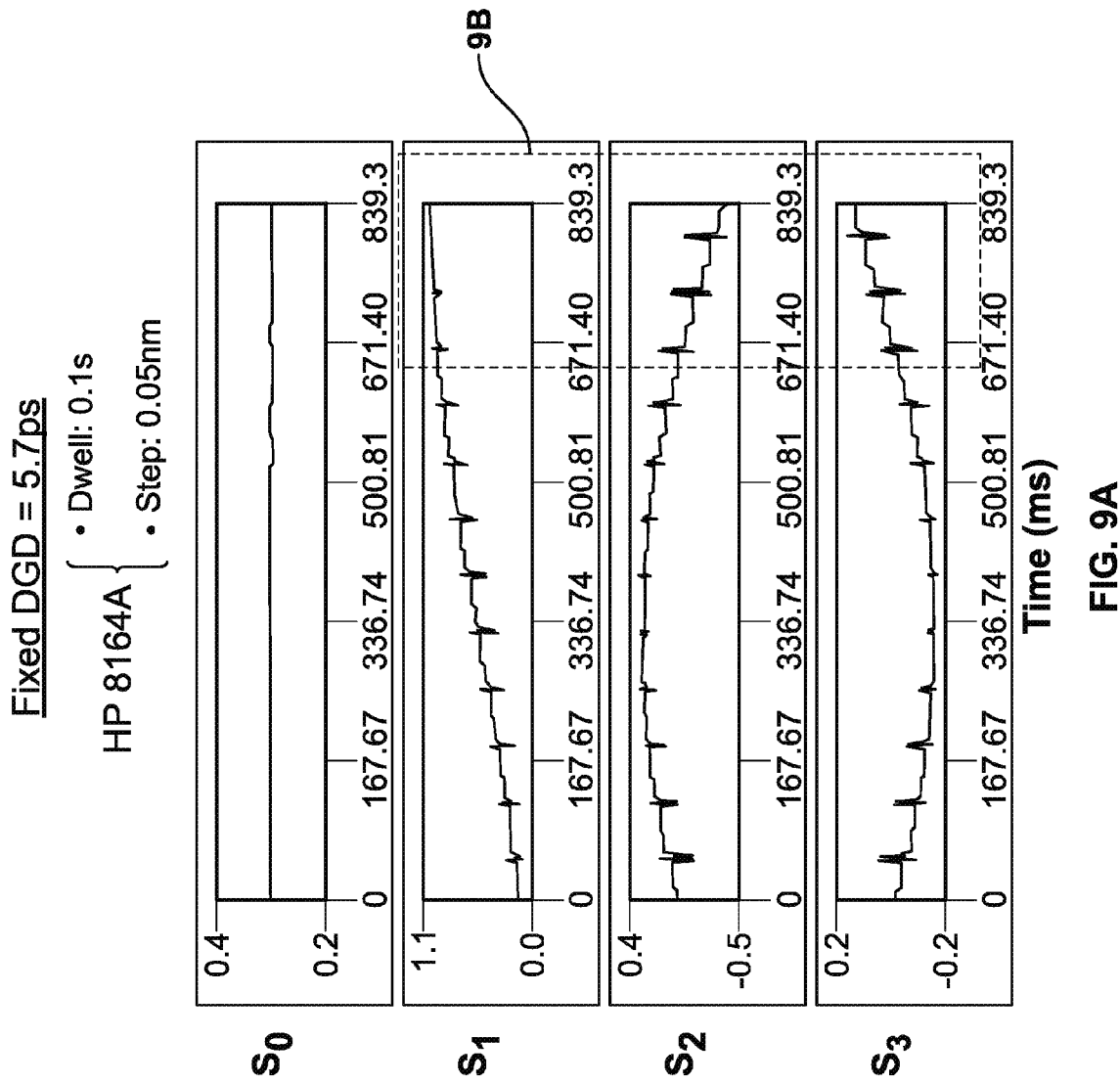

MEASURING OPTICAL SPECTRAL PROPERTY OF LIGHT BASED ON POLARIZATION ANALYSIS

PRIORITY CLAIM

This application claims the benefits of U.S. Provisional Patent Application Ser. No. 61/025,933 entitled "MEASURING OPTICAL SPECTRUM OF LIGHT BASED ON POLARIZATION ANALYSIS" and filed on Feb. 4, 2008, the entire disclosure of which is incorporated by reference as part of the specification of this application.

BACKGROUND

This application relates to optical spectral analysis including apparatus, systems and techniques for measuring optical spectrum of light.

Light can be used in a wide range of applications. One important property of light is the optical spectral property of the light, such as the frequency of the light, and the optical spectrum of light, i.e., the spectral composition of light in wavelength or frequency of the light. For example, behaviors of light signals can depend on the optical spectrum of a given light signal. For another example, the optical spectrum of a given light signal can be used to extract information of a device or material that interacts with the light signal.

Many techniques and devices can be used to analyze the optical spectrum of light. A device for measuring the optical spectrum of light is often referred to as an optical spectrum analyzer (OSA) and is designed to divide a light signal into its constituent wavelengths. The optical power of each constituent wavelength is measured and the measurements of the optical power levels can be graphically displayed with respect to the corresponding constituent wavelengths with the wavelength on the horizontal axis and the measured power on the vertical axis. The performance of an optical spectrum analyzer can be measured by various factors, including the spectral resolution, the spectral range, and the measurement speed.

Optical spectrum analyzers can be implemented various optical analysis mechanisms. Three commonly used mechanisms are 1) using a spatially dispersive element, such as a diffractive grating, to optically separate different spectral components of the light, 2) using a tunable narrow band filter, such as a F-P resonator or a tunable fiber Bragg grating, to sequentially select and detect one spectral component at a time and 3) using an optical interferometer (e.g., a Michaelson or Mach-Zehnder interferometer) to obtain optical interference measurements based on varying the path difference between two optical interfering arms and then performing Fast Fourier Transform (FFT) on the output of the interferometer.

SUMMARY

Examples and implementations of apparatus, systems and techniques are provided for measuring optical spectral property such as the frequency and the optical spectrum of light based on polarization analysis. The described examples and implementations measure and analyze either or both of the state of polarization and the degree of polarization of the light signal to be measured after the light passes through a differential group delay (DGD) line and use the measured polarizations for different DGD values to measure the optical spectral property of the light, e.g., the optical frequency and optical spectrum of light. The spectral resolution and measurement spectral range can be changed by varying the DGD. In one implementation, the optical spectrum can be measured using the disclosed techniques and apparatus based on a polarization measurement and analysis without using an optically dispersive element to spatially separate different spectral components of the light under measurement, without using a tunable optical filter to sequentially separate different spectral components of the light under measurement, one spectral component at a time, or without using an optical interferometer to obtain an optical interference pattern of the light under measurement.

An example of an optical device for measuring spectrum of light described in this application includes a differential group delay (DGD) device positioned to receive light under measurement and to produce output light with a DGD value representing a difference in the group delay between two orthogonal optical polarizations of the light under measurement; an optical detector positioned to receive the output light from the DGD device to measure optical polarization and degree of polarization of the output light; and a processing device that receives measurements of the optical polarization and degree of polarization from the optical detector and processes the measurements to produce a spectrum of the light under measurement.

One example of the above DGD device includes a polarization beam splitter to split the light under measurement into a first optical beam in a first optical polarization along a first optical path and a second optical beam along a second, different optical path in a second optical polarization that is orthogonal to the first optical polarization; a delay mechanism that changes a relative optical path difference between the first and second optical paths to produce the DGD values; and a polarization beam combiner located at an interception of the first and second optical paths to combine light in the first optical path in the first optical polarization and light in the second optical path in the second optical polarization to produce a combined output beam as the output light.

Another example of the above DGD device includes a polarization beam splitter to split the light under measurement into a first optical beam in a first optical polarization along a first optical path and a second optical beam along a second, different optical path in a second optical polarization that is orthogonal to the first optical polarization; a first Faraday reflector in the first optical path to reflect light in the first optical path back towards the polarization beam splitter; a second Faraday reflector in the second optical path to reflect light in the second optical path back towards the polarization beam splitter; and a delay mechanism that changes a relative optical path difference between the first and second optical paths to produce the DGD values. The polarization beam splitter combines reflected light in the first optical path in the second optical polarization and reflected light in the second optical path in the first optical polarization to produce a combined output beam as the output light.

Another example of the above DGD device includes a plurality of variable DGD units cascaded to form an optical path through which the light under measurement is directed to produce the output light. Each variable DGD unit includes a polarization rotator operable to control a polarization of received light in response to a unit control signal; a birefringent segment formed of a birefringent material and located to receive output light from the polarization rotator and to transmit received light; and a unit control element, coupled to the polarization rotator to supply the unit control signal, to control light received by the birefringent segment in a first polarization to cause a first optical delay in light output by the birefringent segment and in a second orthogonal polarization to cause the second, different optical delay in light output by the birefringent segment.

Yet another example of the above DGD device includes a plurality of variable DGD units cascaded to form an optical path through which the light under measurement is directed to produce the output light and a control unit that controls the variable DGD units. In this example, each variable DGD unit includes a polarization rotator operable to control a polarization of received light in response to a unit control signal; and a birefringent segment formed of a birefringent material and located to receive output light from the polarization rotator and to transmit received light. The control unit is coupled to the polarization rotators to supply the unit control signal to each of the polarization rotators, to control light received by the birefringent segment in a first polarization to cause a first optical delay in light output by the birefringent segment and in a second orthogonal polarization to cause the second, different optical delay in light output by the birefringent segment.

An example for a method for measuring optical spectral property of light includes directing light under measurement to pass through a differential group delay (DGD) device to cause a delay between two orthogonal states of polarization of the light under measurement to produce output light; measuring a state of polarization of the output light; and processing the measured state of polarization to determine an increase or decrease in frequency of the light under measurement based on a change in the measured state of polarization. One implementation of this method can include measuring a change in an angle of a respective state of polarization vector of the light on the Poincare Sphere; and determining the increase or decrease in frequency of the light based on the measured change in the angle of the respective state of polarization vector of the light on the Poincare Sphere. Another implementation of the method includes measuring a degree of polarization of the output light; and processing the measured degree of polarization of the output light to determine an optical spectrum of the light under measurement. Another implementation of the method includes measuring a number of complete revolutions of the state of polarization for the output light on the Poincare Sphere; and obtaining an extended spectral range for measuring the light under measurement based on a spectral range determined by a single revolution of the state of polarization and the measured complete revolutions of the state of polarization for the output light on the Poincare Sphere. Yet another implementation of the method includes using a wavelength-swept light source to generate the light under measurement; controlling the DGD device to produce different DGD values on the output light; at each DGD value, scanning a wavelength of the wavelength-swept light source in a spectral range within a scanning time period to measure values of a state of polarization (SOP) and a degree of polarization (DOP) of the output light at different time instants in the scanning time period; processing measured SOP and DOP values at each time instant for different DGD values to obtain a center optical frequency or wavelength of the wavelength-swept light source at each time instant; obtaining a spectral power, which is optical power as a function of the optical wavelength, of the light source at each time instant by Fourier transforming measured DOP values vs. DGD values; and obtaining a 3-D plot of the optical power as a function of the time instant and as a function of the optical wavelength. In addition, this method can convert the 3-D plot into a 3-D plot of the optical power as a function of the center wavelength based on the processing of the measured SOP and DOP values at each time instant for different DGD values as a function of the optical wavelength.

Another example for a method for measuring spectrum of light includes directing light under measurement through a differential group delay (DGD) device to produce output light with a DGD value representing a difference in the group delay between two orthogonal optical polarizations of the light under measurement; measuring optical polarization and degree of polarization of the output light corresponding to the DGD value; and processing the measured optical polarization and degree of polarization for the output light to produce an optical spectrum of the light under measurement.

Yet another example of a device for measuring optical spectral property of lights provided and includes an input port to receive light under measurement; a differential group delay (DGD) device to receive the light from the input port to cause a delay between two orthogonal principal polarization axes of the DGD device to produce output light; an optical polarization detection device positioned to receive the output light from the DGD device to measure at least one of a state of polarization and a degree of polarization of the output light; and a processing device that receives and processes measurements from the optical polarization detection device to extract spectral information of the light under measurement.

The described spectral analysis techniques, apparatus and systems can be implemented in ways that achieve a high measurement speed (e.g., on the order of MHz or more) and therefore can be used to measure the wavelength of a fast scanning laser as a function of time. The spectral resolution is dependent on the size of the DGD and the minimum resolvable frequency spacing is inversely proportional to the DGD value. Therefore, a wide range of spectral resolutions can be obtained by controlling the DGD values to achieve small minimum resolvable frequency spacings (e.g., a few KHz) that can be difficult achieve with other spectrum analyzers.

These and other implementations and features are described in greater detail in the figures, the detailed description and the claims.

BRIEF DESCRIPTION OF DRAWINGS

FIGS. 1A and 1B show examples of optical spectrum analyzers based on polarization measurement and analysis.

FIGS. 5 and 6 illustrate additional examples of DGD mechanisms suitable for use in polarimeter-based optical spectrum analyzers based on polarization measurement and analysis.

FIGS. 7A and 7B show, respectively, the measured SOP (S1) trace and the swept wavelength of a spectral spliced amplified spontaneous emission (ASE) source with respect to time by using a 1-KHz tunable Fabry-Perot filter, where the starting wavelength was obtained from a commercial spectrum analyzer, which can be obtained by using the present polarimeter-based optical spectrum analyzer to determine the absolute starting wavelength directly.

FIGS. 9A and 9B show examples of screen shots of the oscilloscope mode of a high-speed DSP in-line polarimeter (POD-101D, General Photonics Corporation), where the SOP traces (S0, S1, S2, S3) were recorded and SOP evolutions were recorded when the input is swept at a speed of 0.1 sec.

DETAILED DESCRIPTION

Figure 1C:
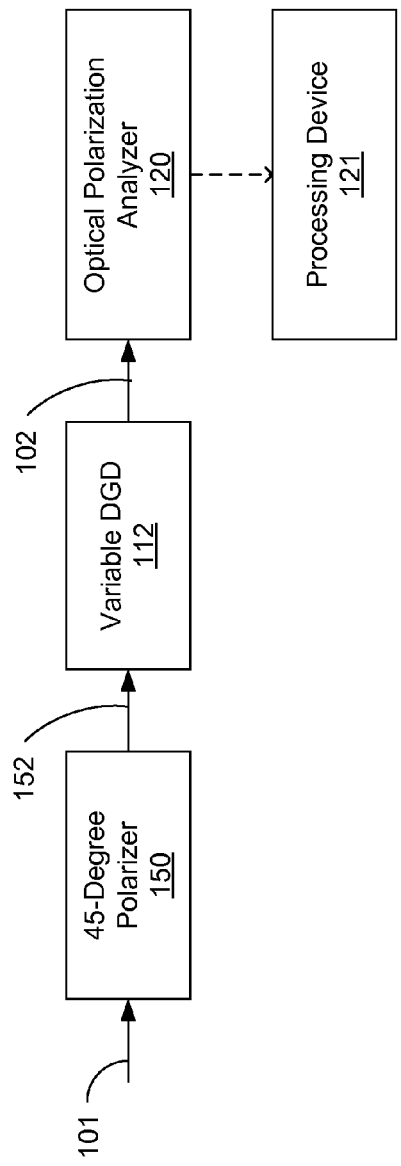
FIGS. 1C and 1D show additional examples of optical spectrum analyzers based on polarization measurement and analysis that implements a linear polarizer at the input of the DGD device.

Specific examples and implementations of apparatus, systems and techniques are described for measuring optical spectral property of light such as the spectrum of light based on e either or both of the state of polarization and the degree of polarization of light after transmitting the light through a differential group delay (DGD) line or device. The spectral resolution and measurement range can be changed by varying the DGD. Under proper configurations in implementing the described techniques, apparatus and systems, the resolution, spectral range, and measurement speed can be optimized based on specific requirements of a spectral analysis application.

Various optical spectrum analyzers use spatial separation of spectral components by one or more optical dispersion elements, temporal separation of spectral components by one or more tunable optical filters or extracting spectral components via optical interference and FFT. In such optical spectrum analyzers, the instrument's spectral resolution, the spectral range, and the measurement speed counter play with one another, and therefore it can be difficult in some specific implementations of such spectrum analyzers to simultaneously achieve good performances for all three parameters. For example, in some FFT based spectrum analyzers, the spectral resolution can be limited by the delay variation range and the stability of the optical interferometer. For another example, the spectral resolution of a diffractive grating based spectrum analyzer can be limited by the beam diameter and the physical separation between the grating and the downstream optical detector. Therefore, the physical size and cost of such a grating based spectrum analyzer may become impractical for achieving a desired high spectral resolution. For fast scanning tunable laser sources with a large scanning range (e.g., about 160 nm) and a high scanning repetition rate (e.g., tens of kHz), it may be desirable to measure the wavelength as a function of time as the laser wavelength of the laser is scanned. This operation can be difficult to achieve in some spectrum analyzers.

As a specific example, the spectral resolution and measurement range of a Fabry-Perot filter based spectrum analyzer are inversely proportional to each other. In order to achieve a good spectral resolution, the measurement range is dictated by the free spectral range of the Fabry-Perot filter and may be compromised. Notably, the spectral resolution $\delta f$ is associated with the Finesse, F, and the free spectral range (FSR) by the following equation:

$$\delta f = FSR/F$$

The Finesse F is determined at least in part by the reflectivities of the two end mirrors and the transmission loss between the two mirrors. In practical devices, the maximum value of the Finesse F is often limited and cannot be increased indefinitely. The free spectral range FSR is proportional to the spectral resolution and determines the spectral measurement range of the instrument. A high spectral resolution leads to a smaller measurement range. Therefore, there exists a tradeoff between the spectral resolution and the spectral measurement range. As such, various spectrum analyzer designs based on tunable Fabry-Perot filters are limited in their spectral resolutions and the spectral measurement ranges.

The present polarization-based spectral analysis techniques and apparatus use a differential group delay (DGD) device and detection of the polarization state to perform spectral analysis of received light. On exemplary method for measuring spectrum of light in this application directs light under measurement through the DGD device to produce output light with a DGD value representing a difference in the group delay between two orthogonal optical polarizations of the light under measurement. The output light is directed into an optical polarization detector to measure the state of polarization (SOP) of the light coming out of the DGD device and the degree of polarization (DOP) of the light may also be measured to obtain the full spectrum of the light. The measured SOP and DOP values are then processed to obtain the spectrum of the input light without a spatially dispersive optical element or a tunable optical filter. The DGD value can be changed to change the spectral resolution and measurement range of the measurement. In this method, the spectral resolution is inversely proportional to the DGD and thus a wide range of spectral resolutions can be obtained by increasing or decreasing the DGD. For example, a spectral resolution down to a few kHz can be practically achieved with an optical fiber based DGD.

The DGD device can be a variable DGD device that can readily achieve a desired high scanning speed (e.g., in the MHz range) by adjusting its DGD values and, therefore, can be used to measure the wavelength of a fast scanning laser as a function of time. Under this design, the DGD device is controlled to scan through a range of DGD values in the output light. The output light is directed into an optical polarization detector to measure the SOPs, DOPs and optical power levels of the output light corresponding to the DGD values. The measured optical power levels and the respective corresponding DGD values for the output light are then processed to produce a measured spectrum of the light under measurement.

The present polarization-based techniques and apparatus can be designed and used to capture transient behaviors of the spectrum or wavelength of the input light that are either difficult or impossible to achieve in other optical spectrum analyzers. Notably, the direction of a SOP trace that can be measured by the present polarization-based techniques and apparatus can be used to measure the direction of a change in the optical wavelength of the input light. This capability of measuring the direction of the change in frequency of light being monitored provides unique applications for the present polarization-based techniques and apparatus.

The spectral width of a light source is caused by various factors or contributions, including the contribution from spontaneous emission noise of the light source and the contribution caused by the center frequency drift with time. These two components can be indistinguishable in practice if the spectral measurement rate (bandwidth) is smaller than the frequency drift rate of the light source, or the spectral resolution of the measurement is larger than the frequency drift range, or both. Because the measurement rate or speed of the present polarization analysis method can be higher than the spectral resolution, the instantaneous frequency variation of a light source as a function of time can be readily obtained. In addition, the direction of the frequency drift in the light under measurement can be determined using the present techniques and apparatus. Such spectral measurements can be difficult, if not impossible, to obtain with other spectrum analysis methods.

FIG. 1A shows an example of an optical spectrum analyzer 100 based on a DGD device 110 that produces either a fixed or variable DGD value. The DGD device 110 is positioned to receive the light 101 under measurement from an optical input port and to produce output light 102 with a DGD value representing a difference in the group delay between two orthogonal optical polarizations of the light under measurement. The DGD device 110 can be a fixed DGD device that produces a fixed DGD value. The DGD device 110 can also be a variable DGD device and a control unit can be coupled to the DGD device to adjust the DGD device to vary DGD values in the output light 102, thus changing the spectral range and spectral resolution of the spectral analysis in the spectrum analyzer 100. An optical polarization detector 120 is positioned downstream from the DGD device 110 to receive the output light 102 from the DGD device 110 to measure optical polarization and degree of polarization of the output light 102 corresponding to a DGD value. The optical polarization detector 120 can be implemented in various configurations such as a polarimeter. A processing device 121, such as a computer or a digital processing device, receives data of measurements of the optical polarization and optical power levels from the optical polarization detector 120 and processes the measured optical polarizations and degrees of polarization for the output light 102 to produce a spectrum of the light 101 under measurement. The processing techniques described below can be implemented by digital processing in the processing device 121.

The input light 101 into the DGD device 110 can be a linear polarization and can be oriented to have equal amounts of powers in two orthogonal directions along the two orthogonal principal states of polarization (PSPs) of the DGD device 110. This configuration can simplify the operation of the spectrum analyzer 100 but is not required for operating the spectrum analyzer 100. Any input polarization can be accepted for the proper operation.

In various implementations of the optical spectrum analyzer in FIG. 1A, the optical paths can be constructed with either optical fiber or in free space. Because light in an optical fiber is generally a random elliptically polarized, it can be difficult to ensure that the input light into the DGD element 110 has equal amounts of optical power in both PSP directions. To address this technical difficulty, the DGD element 110 can be pigtailed with a polarization maintaining (PM) fiber 140 by aligning the slow (or fast) axis of the PM fiber 140 at an angle of 45 degrees from a principal polarization direction of the DGD element 110.

FIG. 1B shows an example of such a design. An optional polarization stabilizer 130 can be placed at the input side of a variable DGD element 112 and operates to accept the light from a non-polarization maintaining fiber (e.g., a single mode fiber) and to output a stable linear polarization aligned with the slow (or fast) axis of an output PM fiber. The output PM fiber of the polarization stabilizer 130 is connected with the input PM fiber 140 of the DGD element 112.

Figure 1D:
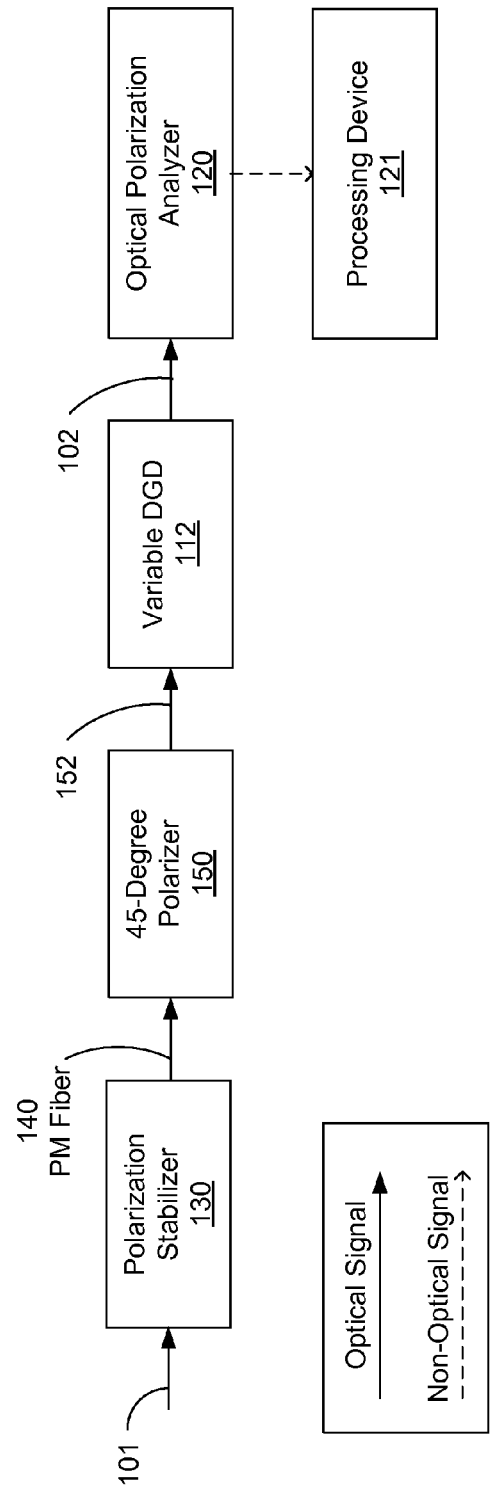

FIGS. 1C and 1D show additional examples of optical spectrum analyzers based on polarization measurement and analysis that implement a linear polarizer at the input of the DGD device. In the example in FIG. 1C, a linear optical polarizer 150 is placed at the input of the variable DGD device 112 and is oriented to be at 45 degrees with respect to a principal polarization axis of the DGD device 112. Hence, the light 152 output by the polarizer 150 has a polarization at 45 degrees with respect to the principal polarization axis of the DGD device 112. This design ensures the equal split of optical power of light between the two orthogonal principal polarization axes of the DGD device 112 regardless of the polarization of the light upstream from the polarizer 150. FIG. 1D shows a use of the polarizer 150 in the design in FIG. 1B where the polarizer 150 is connected between the output of the PM fiber 140 and the DGD device 112 to minimize an effect of any misalignment of the PM fiber 140 or any residual light in the polarization that is orthogonal to the direction of the linear polarization of the polarizer 150 in the input to the DGD device 112.

Figure 2A:
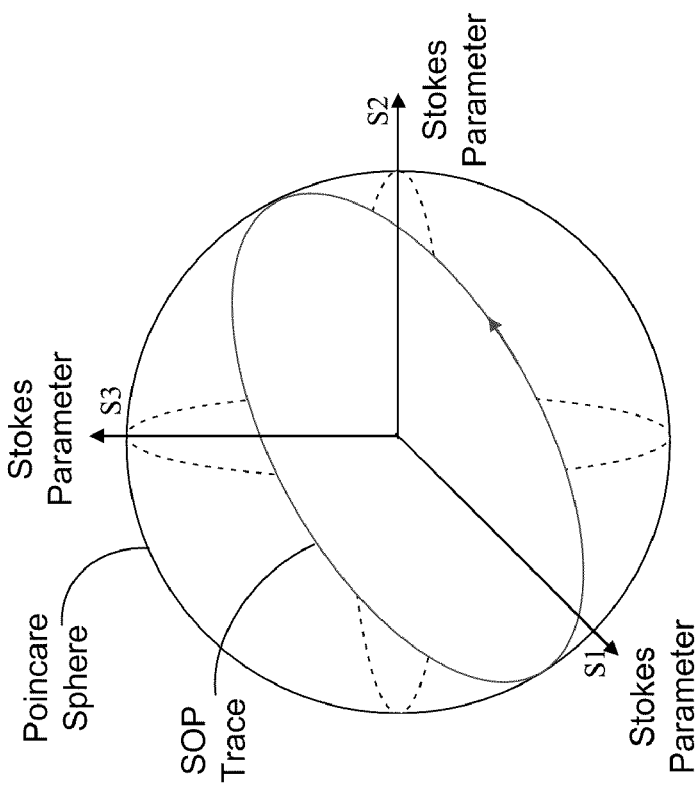
FIGS. 2A and 2B show exemplary traces of the state of polarization of input light in Poincare Sphere associated with a change in the optical frequency of the input light obtained by using the present optical spectrum analyzers based on polarization measurement and analysis.

When light from a tunable light source passes through the DGD element in a spectrum analyzer based on the present system, its state of polarization (SOP) traces a circle on the Poincare Sphere when the optical wavelength or frequency of the light source is tuned, as shown in FIG. 2A. The rate of SOP change as a function of the optical frequency is determined by the value of DGD. Therefore, the DGD value can be obtained from the SOP trace on the Poincare Sphere.

The reverse effect of the above can be used to measure the frequency change of the light source. When the DGD value of the DGD element is known, the optical frequency of the light source can be determined from the SOP trace on the Poincare Sphere. For example, let $\tau$ be the DGD value of the DGD element in time, the complex amplitude of the electrical field of the light after the DGD element can be expressed as:

$$\vec{E} = (E_x e^{i2\pi f\tau}\hat{e}_x + E_y \hat{e}_y)e^{i\phi_o}, \quad (1)$$

where $E_x$ and $E_y$ are the amplitudes of the electrical field along the x and y directions of the chosen coordinate system, respectively; $\hat{e}_x$ and $\hat{e}_y$ are the unit vectors along the x and y directions, respectively; and $\phi_o$ is the common phase.

Figure 2B:
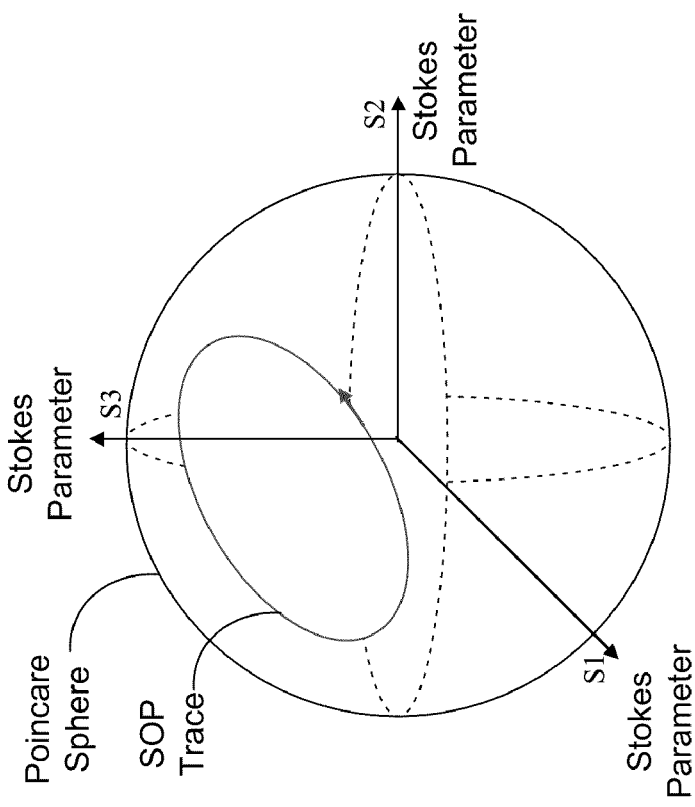

Under the operating condition that the amplitudes of the electrical field along the x and y directions are equal ($E_x = E_y$), the SOP traces the largest circle on the Poincare Sphere, as shown in FIG. 2B. This operating condition produces the highest frequency measurement resolution or sensitivity. The angular difference $\Delta\theta$ between two polarization states at two different frequencies $f_1$ and $f_2$ in the input light is the phase difference in Eq. (1) and can be expressed as:

$$\Delta\theta = 2\pi(f_1 - f_2)\tau \quad (2)$$

For a known differential delay $\tau$ in time, the frequency difference can be calculated from the angular difference of SOP vectors on Poincare Sphere as:

$$f_1 - f_2 = \frac{1}{2\pi}\frac{\Delta\theta}{\tau} \quad (3)$$

In one implementation, the SOP can be measured for different differential delay times, and the measured changes in SOP over the differential delay times can be converted into changes in the frequency of the input light, which can be further processed to obtain the frequency and the corresponding power of the light (e.g., the Stokes parameter So is the optical power) as a function of time (e.g., the horizontal axis is the time, the left vertical axis is the frequency and the right vertical axis is the power). Measurements of optical powers as a function of the optical frequency can also be obtained, where the horizontal axis is the frequency and the vertical axis is the optical power.

The frequency resolution of the present polarization-based spectral analysis techniques and apparatus can be optimized without compromising the spectral measurement range. If SOP resolution of the polarization analyzer is 0.36 deg., a number of 360/0.36=1000 points can be resolved in a full circle on Poincare Sphere. Based on Eq. (1), for a given $\tau$ for the DGD value, the SOP circle in the Poincare Sphere repeats itself if the frequency variation range $\Delta f$ is larger than $1/\tau$. If the trace evolution direction information is not taken into account, the measurement range and the frequency resolution of the polarimeter based spectrum analyzer are given by the following two equations, respectively:

$$\Delta f = 1/\tau \quad (4)$$

$$\sigma f = \Delta f/1000 = 10^{-3}/\tau \quad (5)$$

The above spectral measurement range in Eq. (4) is for one-cycle measurement range less than $1/\tau$. As an example, for DGD value $\tau$ of 1000 ps, the frequency measurement range and resolution are 1 GHz and 1 MHz, respectively.

The tradeoff between the resolution and the spectral measurement range exists if changes in SOP in only one-cycle on the Poincare sphere are considered. Since the SOP circle repeats itself on the sphere if the frequency variation range $\Delta f$ is larger than $1/\tau$, the valuable information of the direction of the SOP evolution can be used to obtain a total measurement range by the multiplication of the number N of the SOP cycles: $\Delta f = N \times 1/\tau$. This technique provides a large spectral range, without compromising the spectral resolution. The spectral resolution is dictated by the value of the fixed DGD element and, hence, the spectral resolution can be improved by using a DGD element with a large DGD value without sacrificing the measurement range. Therefore, the present spectral analysis techniques and apparatus can be free of the well-known tradeoff between the spectral range and the spectral resolution in various spectrum analyzers based on other designs.

In one implementation, a variable DGD element can be used to achieve both a high spectral resolution and a large measurement range. For a high spectral resolution, the DGD value of the variable DGD element can be increased. For a large measurement range, the DGD value can be reduced. As long as the DGD value is precisely known, the spectral information can be obtained. For example, for a variable DGD with a minimum and maximum DGD values of 1.4 ps and 45 ps, the measurement range and resolution are 700 GHz in frequency (i.e., 87 nm in wavelength) and 20 MHz, respectively. In practice, the direction of the SOP evolution can be measured and therefore the frequency measurement range can be multiple times of $1/\tau$. Therefore, the SOP trace evolution direction information can be used to extend the frequency measurement range of the polarization-based spectral analysis techniques and apparatus.

FIGS. 3A, 3B, 3C and 3D illustrate aspects of operations of the present optical spectrum analyzers based on polarization measurement and analysis.

Figure 3A:
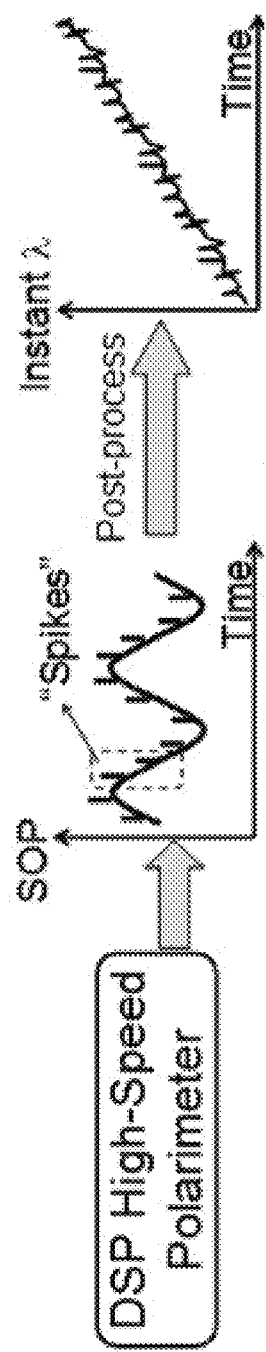
FIGS. 3A, 3B, 3C and 3D illustrate aspects of operations of the present optical spectrum analyzers based on polarization measurement and analysis.

FIG. 3A shows an example of the swept-wavelength operation mode of the present optical spectrum analyzers based on polarization measurement and analysis. Referring to FIGS. 1A and 1B, the optical polarization analyzer 120 can be implemented by a high-speed polarimeter which measures the time-resolved SOP traces. The optical wavelength of the input light is swept and this sweep in the optical wavelength is reflected in the measured SOP with respect to time. Such measured time-resolved SOP traces carry detailed polarization evolution information. Based on the known DGD value, the measured SOP traces can be used obtain the instantaneous wavelength evolution by calculating the polarization rotation angle on the Poincare sphere using Eq. (3). In FIG. 3A, the measured SOP traces may have spikes over time which are caused by sudden changes of the optical wavelength or frequency.

Figure 3C:
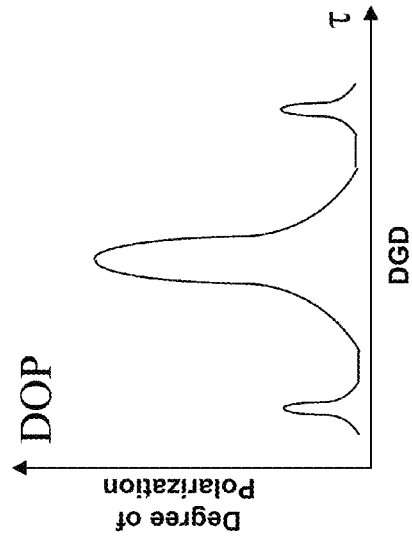
Figure 3B:
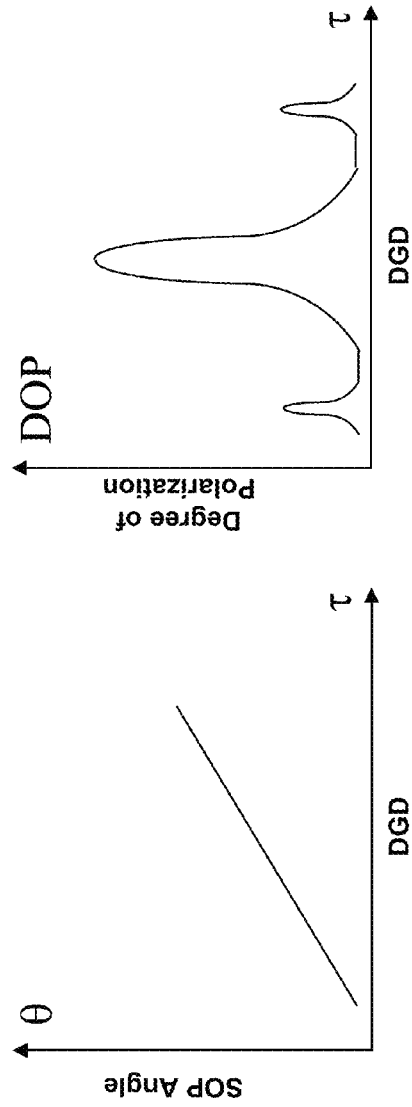

From Eq. (1), the SOP angle $\theta$ on the Poincare Sphere for the case $E_x = E_y$ is:

$$\theta = \theta_o + 2\pi f \tau \quad (6)$$

where $\theta_o$ is a constant. For a fixed optical frequency f, the SOP angle $\theta$ is a linear curve as a function of the DGD value $\tau$, as shown in FIG. 3B. Therefore, measurements of the SOP angle $\theta$ and the corresponding DGD values for $\tau$ can be used in a curve fitting based on Eq. (6) to obtain the optical frequency f of light based on the slope of the linear curve.

Based on the above polarization analysis, the SOP of light can be measured and processed to determine the frequency of the light under measurement and, notably, the shift in frequency of the light under measurement. The instrument designs in FIGS. 1A-1D can be configured to measure the SOP of light coming out of the DGD device 110 or 112 and to provide the spectral analysis of the light under measurement. The full spectrum of the light under measurement can be determined by further measuring and processing the degree of polarization (DOP) of the light. Depending on the specific applications, the instrument designs in FIGS. 1A-1D can be configured to measure either or both of the SOP and DOP of the light to obtain spectral information of the input light based on the polarization measurement and analysis.

In Eq. (1), it is assumed that the signal to be measured is monochromatic with an infinite coherence length. In practice, an optical signal generally has a finite spectral width or finite coherence length. Therefore, as the optical path length corresponding to the DGD value $\tau$ in time is larger than the coherence length of the signal, the two polarization components do not add up coherently when they are combined. Consequently, the output of the combined light becomes depolarized with its degree of polarization (DOP) approaching zero. For a DGD value correspond to an optical path length less than the coherence length, the DOP of the light is less than unity. As the DGD value $\tau$ in time increases, the DOP decreases. Because the coherence length is related to the spectral shape and width, the DOP vs DGD curve is also related to the spectral shape and width of the light source under test.

The DOP of the light signal can be expressed as:

$$DOP(\tau) = \sqrt{4(\gamma^2 - \gamma)[1 - R^2(\tau)/R^2(0)] + 1} \quad (7)$$

where $\gamma$ is the power distribution ratio of the two polarization components with respect to the principle state of polarization (PSP) of the DGD element ($\gamma = \frac{1}{2}$ when the powers of the two polarization components are equal). $R(\tau)$ is the self correlation function of the light source under test and relates to the power spectrum $P(\omega)$ by:

$$R(\tau) = \int_{-\infty}^{\infty} P(\omega) e^{-i\omega\tau} d\omega \quad (8)$$

For the case of equal power splitting ($E_x = E_y$ and $\gamma = \frac{1}{2}$), the DOP can be simplified as:

$$DOP(\tau) = \frac{R(\tau)}{R(0)} \quad (9)$$

$$= \frac{\int_{-\infty}^{\infty} P(\omega) e^{-i\omega\tau} d\omega}{S_o}$$

where $S_o$ is the total optical power. Therefore, the power spectrum of the light source under test can be obtained from the DOP measurement as:

$$P(\omega) = S_o \int_{-\infty}^{\infty} DOP(\tau) e^{i\omega\tau} d\tau \quad (10)$$

The above equations from Eq. (6) to Eq. (10) suggest that, measurements of both the SOP and DOP of the light as a function of $\tau$, as shown in FIG. 3B and FIG. 3C, can be used to obtain both the power spectrum and the frequency of the input light.

Figure 3D:
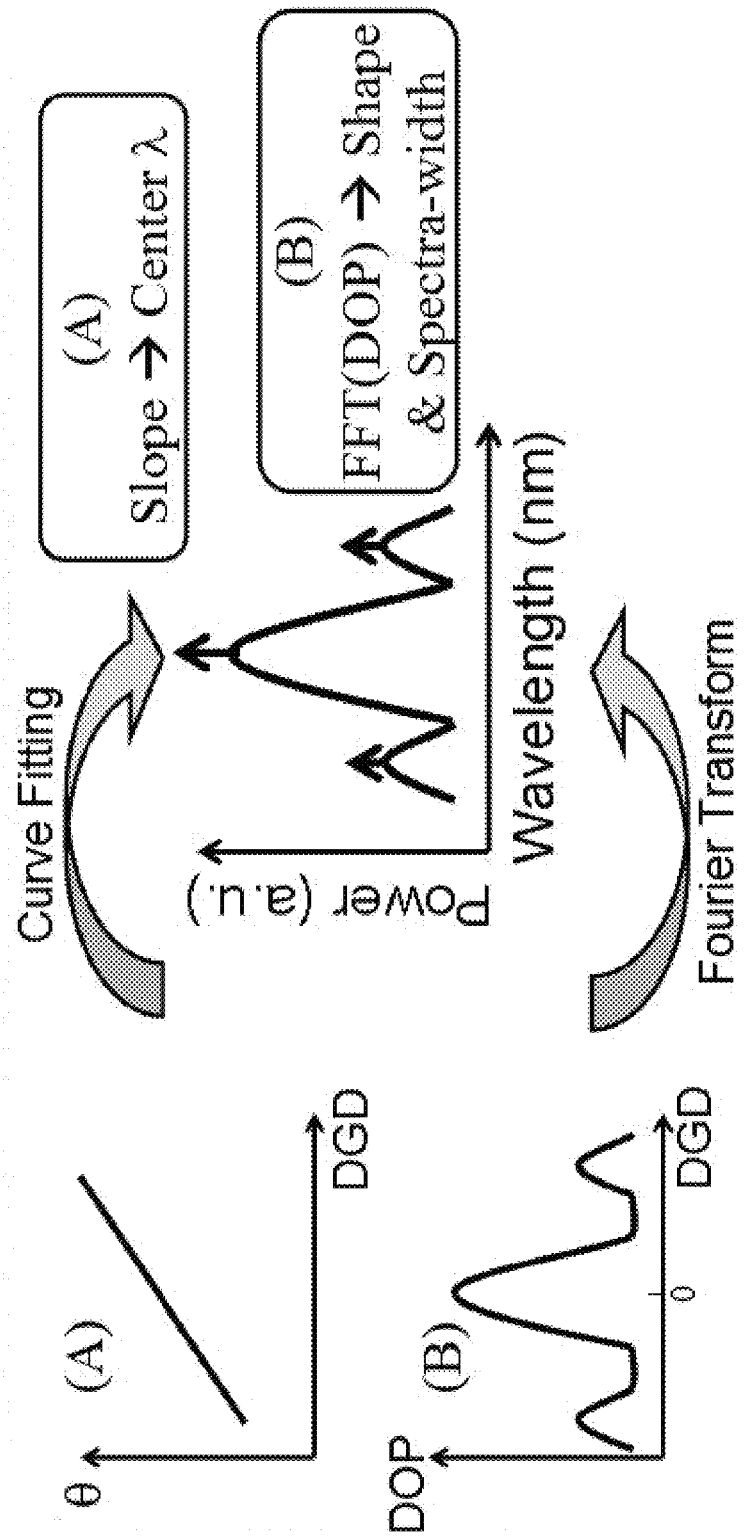

FIG. 3D illustrates an example for analyzing the spectrum of a fixed wavelength source by using the present optical spectrum analyzers based on polarization measurement and analysis. In this spectrum analysis mode, the variable DGD element 112 in FIG. 1B is used to obtain measurements of the SOP angle and the DOP for different DGD values. The spectrum of the light source is analyzed by post-processing the recorded SOP and DOP information from the polarimeter 120 as the DGD is tuned. For a fixed wavelength input source, the polarization rotation angle is a linear function of the DGD ($\tau$) value. A curve fitting processing can be performed on the measurement data using Eq. (6) to obtain the center frequency of the input light under measurement, i.e., the center frequency of the light source. The measured DOP information can be processed by, e.g., FFT processing, to obtain the optical power of the input light as a function of the optical wavelength which can be used to determine the spectral lineshape and the linewidth of the input light.

As indicated by Eq. (6), the measured frequency stability and the stability of DGD value $\tau$ are dependent on each other. The frequency stability may drift due to thermal or other environmental changes. Differentiation of Eq. (6) yields:

$$\Delta f / f = -\Delta \tau / \tau \quad (11)$$

where $\Delta\tau/\tau$ is the relative group delay change coefficient. For optical fiber, thermal effect is dominant and the thermal delay coefficient of the fiber is around $10^{-6}$/deg. For an optical signal with a center frequency of $10^{15}$ Hz, the frequency measurement stability is about 1 GHz per degree, which is about the same as that of a Fabry-Perot tunable filter.

Figures 4A, 4B, 4C:
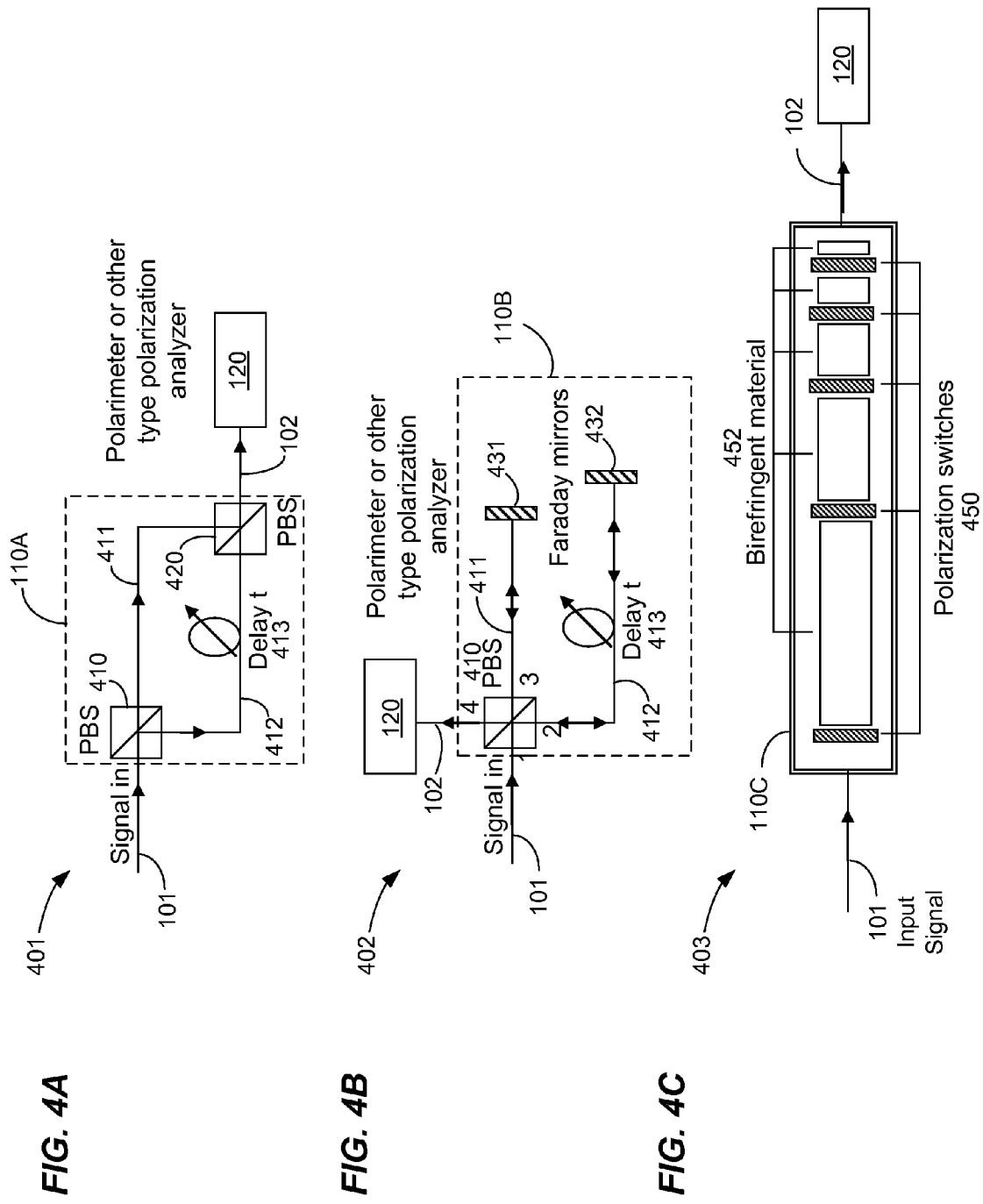
FIGS. 4A, 4B and 4C show implementation examples of present optical spectrum analyzers based on polarization measurement and analysis using different DGD mechanisms.

Examples of DGD-based optical spectrum analyzers are provided below. The DGD element can be constructed in various configurations. One simple form of the DGD device is a piece of PM fiber or a birefringent material which may have a relatively small DGD value and a limited tuning range. Large DGD values and wide tunable range for the DGD value may be achieved by various optical delay devices. FIGS. 4A, 4B, and 4C show three different spectrum analyzer examples using three different types of variable DGD elements.

In FIG. 4A, a DGD-based optical spectrum analyzer 401 implements a variable DGD device 110A that includes a polarization beam splitter (PBS) 410 that splits the input light 101 split into two mutually orthogonal polarization components along two optical paths 411 and 412, respectively. A second PBS 420 combines the light in the two optical paths 411 and 412 into a combined signal as the signal 102 to be measured by the optical polarization detector 120. The second optical path 412 includes a delay device 413 that produces a delay in time or phase. The delay device 413 can be a variable delay device that produces a variable delay in response to a control signal or a fixed delay device that produces a pre-determined and fixed delay. Therefore, the delay of the polarization component in the second optical path 412 can be controlled and delayed with respect to that of the other polarization component in the first optical path 411 by a fixed or variable delay. The two polarization components are then combined by the second PBS 420 before entering into the polarization detector 120.

The DGD-based optical spectrum analyzer 402 in FIG. 4B implements a different two-path design in a DGD device 110B to produce a desired optical delay. Similarly to the DGD device 110A, the DGD device 110B includes the PBS 410 to split the input light 101 into two mutually orthogonal polarization components along two optical paths 411 and 412, respectively. Instead of using a second PBS 420 to combine light from the two optical paths 411 and 412, the DGD device 110B implements a first reflector 431 in the first optical path 411 to reflect the light back to the PBS 410 and a second reflector 432 in the second optical path 412 to reflect the light back to the PBS 410. As illustrated in FIG. 4B, each of the two reflectors 431 and 432 is a Faraday mirror, which formed by a 45-degree Faraday rotator and a reflector with the Faraday rotator located between the PBS 410 and the reflector, to rotate the polarization by 90 degrees in the reflected light with respect to the polarization direction of the light received by each reflector. This polarization-rotated reflected light is sent back to the PBS 410. The same PBS 410 combines the reflected light in both the first and second optical paths 411 and 412 to produce a combined signal as the signal 102 to the optical polarization detector 120. As illustrated, the PBS 410 has port input and output ports 1, 2, 3 and 4 where the port 1 is to receive the input light 101, the port 2 is to direct the light in the second polarization component to the second optical path 412 and to receive the reflected light from the second optical path 412, and the port 3 is to direct the light in the first polarization component to the first optical path 411 and to receive the reflected light from the first optical path 411. The port 4 of the PBS 410 is to direct the combined light 102 to the optical polarization detector 120.

One of the polarization components in one of the two optical paths 411 and 412 is delayed relative to the other. A delay device 413, which can produce a variable delay in response to a control signal or a fixed delay, is placed in the second optical path 412 between the PBS 410 and the reflector 432. Hence, the light in the second optical path passes through the delay device 413 twice and the amount of the optical delay relative to the light in the first optical path 411 is twice the optical delay produced b the delay device 413.

The reflected light in the two optical paths 411 and 412 is combined by the same PBS 410 and exit from port 4 to enter into the polarization detector 120. If the two polarization components propagate in polarization maintaining media, such as free space or PM fiber, each Faraday mirror 431 or 432 can be replaced by a combination of a reflector and a quarter wave plate with its optical axis oriented at 45 degrees from the corresponding polarization direction of each polarization component.

FIG. 4C shows another DGD-based optical spectrum analyzer 403 which implements a DGD device 110C that is constructed using multiple pieces 452 of birefringence material and polarization rotators or switches 450. In this example, the DGD device 110C includes multiple variable DGD units cascaded to form an optical path through which the light under measurement is directed to produce the output light. Each variable DGD unit includes a polarization rotator or switch 450 operable to control a polarization of received light in response to a unit control signal; and a birefringent segment 452 formed of a birefringent material and located to receive output light from the corresponding polarization rotator 450 and to transmit received light. A control unit is coupled to the polarization rotators 450 to supply the unit control signal to each of the polarization rotators 450, to control light received by a corresponding birefringent segment 452 in a first polarization to cause a first optical delay in light in the first polarization output by the birefringent segment 452 and to control light received by the birefringent segment 452 in a second orthogonal polarization to cause a second, different optical delay in light in the second polarization output by the birefringent segment 452. The birefringent material for the birefringent segment 452 can be, for example, a birefringent crystal or a polarization maintaining (PM) fiber. Different birefringent segments 452 in different variable DGD units can have different lengths along the optical path. Two adjacent different birefringent segments 452 can differ in length by a constant factor such as 2. The lengths of the different birefringent segments 452 can increase or decrease successively along the optical path from the first variable DGD unit that receives the input light 101 under measurement to the last variable DGD unit that outputs the output light 102. The variable DGD units may include a first variable optical delay unit whose birefringent segment is formed of a first birefringent material and a second variable optical delay unit whose birefringent segment is formed of a second birefringent material that has birefringence different from the first birefringent material. Some examples of variable DGD devices that can be used in for the present spectrum analyzers are disclosed in U.S. Pat. Nos. 5,978,125, 5,796,510, RE38809E, and RE38735E and by L. S. Yan et al. in "Programmable Group Delay Module using binary polarization switching," IEEE J. of Lightwave Technology, Vol. 21, no. 7, (2003). The entire disclosures the above referenced four patents and one article are incorporated by reference as part of the disclosure of this document.

In FIG. 4A and FIG. 4B where the delay device 413 is a variable delay device, the variable delay device 413 can be a motorized delay line. As described above, the DGD device 110B design in FIG. 4B doubles the amount of the delay produced by the delay element. To further increase the delay range and to keep the delay line compact, a delay quadrupler may be used to increase the effective delay to four times the delay of a delay line. The following examples illustrate techniques and device designs for quadrupling the delay in an optical delay line such as an optical fiber loop or coil without increasing the actual length of the fiber. The polarization of light is manipulated to allow the light to pass through a fiber loop or coil four times in a relatively simple optical setup. Such optical delays can be applied to various applications to achieve a compact optical delay package, including OEO and OCT systems.

FIG. 5 illustrate an example of an optical delay device 501 that quadruples the signal delay in a given optical fiber loop or coil. An optical polarization beam splitter (PBS) 503 is provided and is configured to include a first port 1, a second port 2 and a third port 3. An input light beam 101, which is linearly polarized at a first optical polarization, is directed into the port 1 of the PBS 503 and transmits through the PBS 503 between the first port 1 and the second port 2. The PBS 103 is configured to reflect light at a second optical polarization orthogonal to the first optical polarization, that enters the PBS 503 at either of the second port 2 and the third port 3, to the other of the second port 2 and the third port 3. A first optical path 510 is provided as the optical delay path having a first end optically coupled to the second port 2 of the PBS 503 to receive light from the second port 2 and to direct light back to the second port 2 and a Faraday reflector 530 coupled to a second end of the first optical path 510 to reflect light. The Faraday reflector 530 can be implemented by a 45-degree Faraday rotator 531 and a reflector 532 and is configured to reflect light received from the first optical path 510 back to the first optical path 510 with a reflected optical polarization that is, at each location along the first optical path 510, orthogonal to an optical polarization of the light when traveling in the first optical path 510 from the PBS 503 towards the Faraday reflector 530 prior to the reflection.

Notably, the device in FIG. 5 includes a second optical path 520 having a first end optically coupled to the third port 3 of the PBS 503 to receive light from the second port 2 and to direct light to the third port 3; and a reflector 540 coupled to a second end of the second optical path 520 to reflect light received from the second optical path 520 back to the second optical path 520 with a reflected optical polarization that is the same as an optical polarization of the light at the third port 3 when initially entering the second optical path 520. Hence, the light reflected by the reflector 140 back to the port 2 of the PBS 503 remains in the second polarization and thus is reflected by the PBS 503 to the port 2 to travel in the first optical path 510 for the second time. After reflecting back by the Faraday rotator 530 for the second time, the light returns to the port 2 of the PBS 503 in the first polarization and thus transmits through the PBS 103 to emerge at the port 1 as the output light beam 102.

Under this design, the input light 101 in the first polarization received at the port 1 of the PBS 503 travels through the first optical path 510 four times and the second optical path 520 two times and returns to the port 1 as the output light 102. A fiber delay loop or coil can be used as part of the first optical path 510 to quadruple the amount of the delay of the fiber loop.

The delay produced by the device in FIG. 5 can be variable by incorporating a variable element in either or both of the optical paths 510 and 520. In the illustrated example, the optical delay device 500 implements a variable optical delay 550 in the first optical path 510 to produce a variable delay in the output 102. This variable delay 550 can be achieved in various configurations, including a fiber stretcher engaged to a fiber loop. The variable optical delay 550 may be a variable delay element in a single mode (SM) fiber or a polarization maintaining (PM) fiber that is used to form the optical path between the port 2 of the PBS 503 and the Faraday rotator 530. With this configuration, and a delay change is amplified four times. Alternatively, the variable delay 550 can be implemented in the optical path formed by the port 3 of the PBS 103 and the mirror 140 where the a delay change is doubled.

In operation, the PBS 503 is used to receive an input light signal before directing the signal to the delay fiber in the first optical path 510. The polarization of the input light signal 101 is controlled so that the input light signal 101 is in the linear polarization that transmits through the PBS 503. The PBS 503 has three ports: port 1 to receive the input light signal 101, port 2 to receive the transmission of light received at the port 1 and port 3 to which a reflected signal produced by reflection of the light received at the port 2 is directed. In particular, the polarization of the light that enters the port 1 and transmits through the PBS 503 at the port 2 is orthogonal to the polarization of light that enters the PBS 503 at port 2 and is reflected to exit the PBS 503 at the port 3. The delay fiber in the first optical path 510 is optically connected to the port 2 of the PBS 503 to, at least, (1) receive optical transmission of light received at port 1, and (2) receive optical reflection of light received at port 3 and reflected by the PBS 503. The Faraday reflector 530 is placed at the end of the delay fiber to reflect light that transmits through the delay fiber for the second time back to the PBS 503. The Faraday rotator 531 is a 45-degree Faraday rotator to effectuate an ortho-conjugate property: the state of polarization (SOP) of the reflected light by the Faraday reflector 530 is orthogonal to the forward going beam at every point along the fiber in the first optical path 510. As a result, at the PBS 503, the SOP of the reflected signal is orthogonal to that of the forward going light and therefore all light signal is directed to port 3 of the PBS 503. The reflector 540 placed at the end of port 3 reflects the light from the port 3 back to the port 3 of the PBS 503 without changing its SOP. The reflector 540 can be a mirror that is directly attached to or formed on the facet of the port 3, or can be separated from the PBS 503 with a medium, such as a PM fiber or a free-space, as long as the SOP of the light is not changed when the light is directed back to the port 3 by the mirror 140. Because the reflected light from the mirror 540 retains its SOP, the PBS 503 reflects the reflected light from the mirror 540 to exit the PBS 503 at the port 2 to transmit through the delay fiber in the first optical path 110 for the third time and is reflected by the Faraday rotator 130 for the second time. This reflected light from the Faraday reflector 530 passes through the delay fiber for the fourth time to reach port 2 of the PBS 503. At the PBS 503, the SOP of the twice-reflected light by the Faraday mirror 530 is orthogonal to the SOP for the light that is reflected by the PBS 503 from the port 3 to the port 2 and, therefore, is the same as that of the input light 101 received at the port 1. As a result, the twice-reflected light by the Faraday reflector 530, when entering the port 2, transmits through the PBS 503 to the input port 1 of the PBS 503. Therefore, the light passes the delay fiber totally 4 times before exiting the PBS 103 as the output light 102.

FIG. 6 shows a stand-alone optical delay device 600 based on the design in FIG. 5 to allow a user to attach a user-selected optical delay element to quadruple the delay of the element. The optical delay device 600 includes an optical circulator 610, an input optical port 601 to receive input light to be delayed (e.g., the input beam 101), an output optical port 602 to output the delayed light (e.g., the output beam 102), and two user optical ports 631 and 632 for connecting the user optical delay element 640. The optical circulator 610 has three ports 1, 2 and 3 to direct light received at the port 1 to the port 2, and direct light received at the port 2 to the port 3. The port 1 is optically linked via a fiber or free space to the input port 301 to receive the input light. The port 2 is optically linked via a fiber or free space to the port 1 of the PBS 103 to direct light to the PBS 503 and to receive output light from the PBS 503. The port 3 of the circulator 610 is optically linked via a fiber or free space to the port 602 so that the light received from the port 1 of the PBS 503 is first directed by the circulator 610 and is sent out of the device 600 at the port 602. This circulator 610 can be implemented to route the input light 101 and the output light 102.

In device 600 in FIG. 6, the first optical path 510 in FIG. 5 is replaced by an optical path 621 linking the port 2 of the PBS 503 and the first user optical port 631 and an optical path 622 linking the user optical port 632 and the Faraday reflector 530. The two optical paths 621 and 622 are not directly connected to each other and each of the two optical paths 621 and 622 can be a segment of fiber or free space. A user can connect the optical delay element 640, either fixed or variable, to the two user optical ports 631 and 632 to control the amount of the delay in the returned light at the output port 602. The ports 601, 602, 631 and 632 can be fiber ports that receive fiber connectors commonly used in fiber optics. A device casing can be used to enclose all components in FIG. 6 within an enclosure and the ports 601, 602, 631 and 632 are mounted on the device casing to allow for easy access by a user. All components can be enclosed in an enclosure that is represented by the box formed by dashed lines.

Various tests and measurements were conducted on the above examples of DGD-based optical spectrum analyzers or polarimeter-based optical spectrum analyzers (P-OSAs) based on polarization measurements and analysis. The results of tests and measurements are present below to illustrate various characteristics of such optical spectrum analyzers.

FIGS. 7A and 7B show measurements of light generated by a frequency-swept light sources based on a DGD-based optical spectrum analyzer. The frequency-swept light source is a spectral spliced amplified spontaneous emission (ASE) source using a high speed Fabry-Perot tunable filter with a sweeping speed up to 40 KHz and a high power Er-doped fiber amplifier (EDFA) with an output of about 15 dBm. The sweeping wavelength range of the high-speed tunable filter was properly adjusted using a function generator, with frequency, amplitude and offset matched to the EDFA gain bandwidth. A birefringent crystal with a DGD of 5.7-ps is used as a fixed DGD element, with input adjusted by a polarization controller for equal power splitting between two eigen polarization states that are orthogonal to each other. The output port of the DGD element is directed to a high-speed DSP in-line polarimeter manufactured by General Photonics (Product No. POD-101D) for real-time Poincare sphere display and SOP trace recording at a sampling rate near 1 MHz.

FIG. 7A shows the modulation of one (S1) of the recorded Stokes parameters from the polarimeter when the tunable filter was swept at 1-KHz rate. The amplitude and the offset from the sinusoidal function generator were set to be 10V and 3.5V, respectively. Utilizing the directional SOP evolution, the accumulated polarization rotation angle was obtained and is shown in the right Y axis of FIG. 7B. The multiple full circles of the SOP modulation can be correctly interpreted to the accumulated rotation angle. Based on Eq. (3), the swept wavelength can be expressed as a function of time (in the left Y axis of FIG. 7B) from the accumulated polarization angle. The starting wavelength was determined by using a spectrum analyzer. In practice, a tunable DGD element can be used to obtain the reference wavelength. The measured data shows that the swept wavelength curve resembles well with the sinusoidal sweeping function and the time period is determined by the swept frequency of 1-KHz.

Figure 8A:
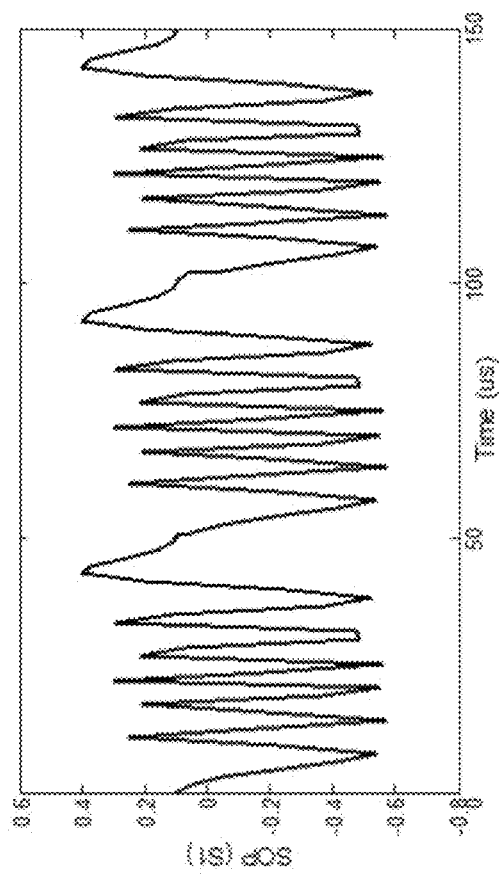
FIGS. 8A and 8B show, respectively, the measured SOP (S1) trace and the swept wavelength of a commercial tunable laser source with respect to time by using a 1-KHz tunable Fabry-Perot filter, where the starting wavelength was obtained from a commercial spectrum analyzer, which can be obtained by using the present polarimeter-based optical spectrum analyzer to determine the absolute starting wavelength directly.
Figure 8B:
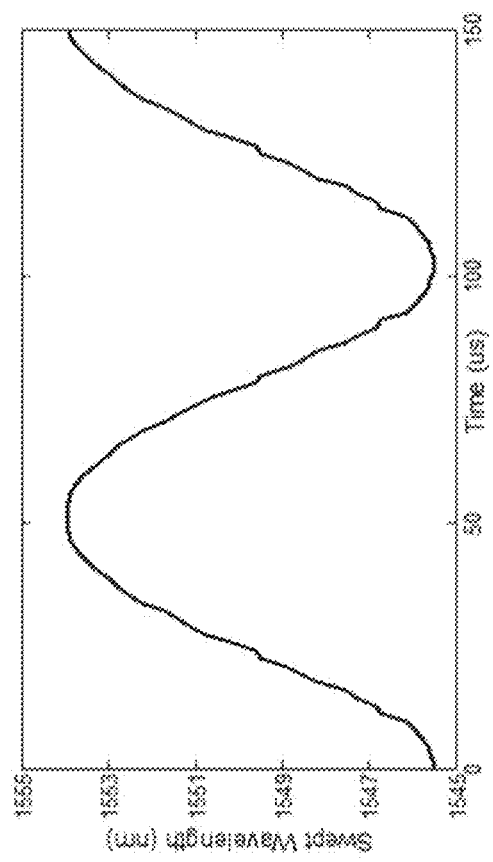

FIGS. 8A and 8B show measurements of light generated by another frequency-swept light sources based on a DGD-based optical spectrum analyzer. This frequency-swept light source is the HP 8164A tunable laser source (TLS) with a sweep step of 0.05 nm and a dwell time of 0.1 second at each frequency and the DGD-based optical spectrum analyzer is the same as used for measurements in FIGS. 7A and 7B. FIG. 8A shows one of the recorded Stokes parameters from DSP polarimeter when the tunable filter was swept at a higher rate of 10-KHz. The amplitude and the offset of the function generator were set at 5V and 4.5V, respectively. FIG. 8B shows the derived swept wavelength as a function of time. A period of 100 µs shows that the swept frequency is at 10-KHz. Due to the limited sampling rate of the DSP polarimeter, the recovered SOP trace is not as smooth as that of the 1-KHz case. Improved results are expected if the sampling rate of the polarimeter is increased. The reduced SOP modulation cycle and the reduced swept wavelength range were due to the smaller amplitude swing applied to the Fabry-Perot filter during the measurements.

Figure 9B:
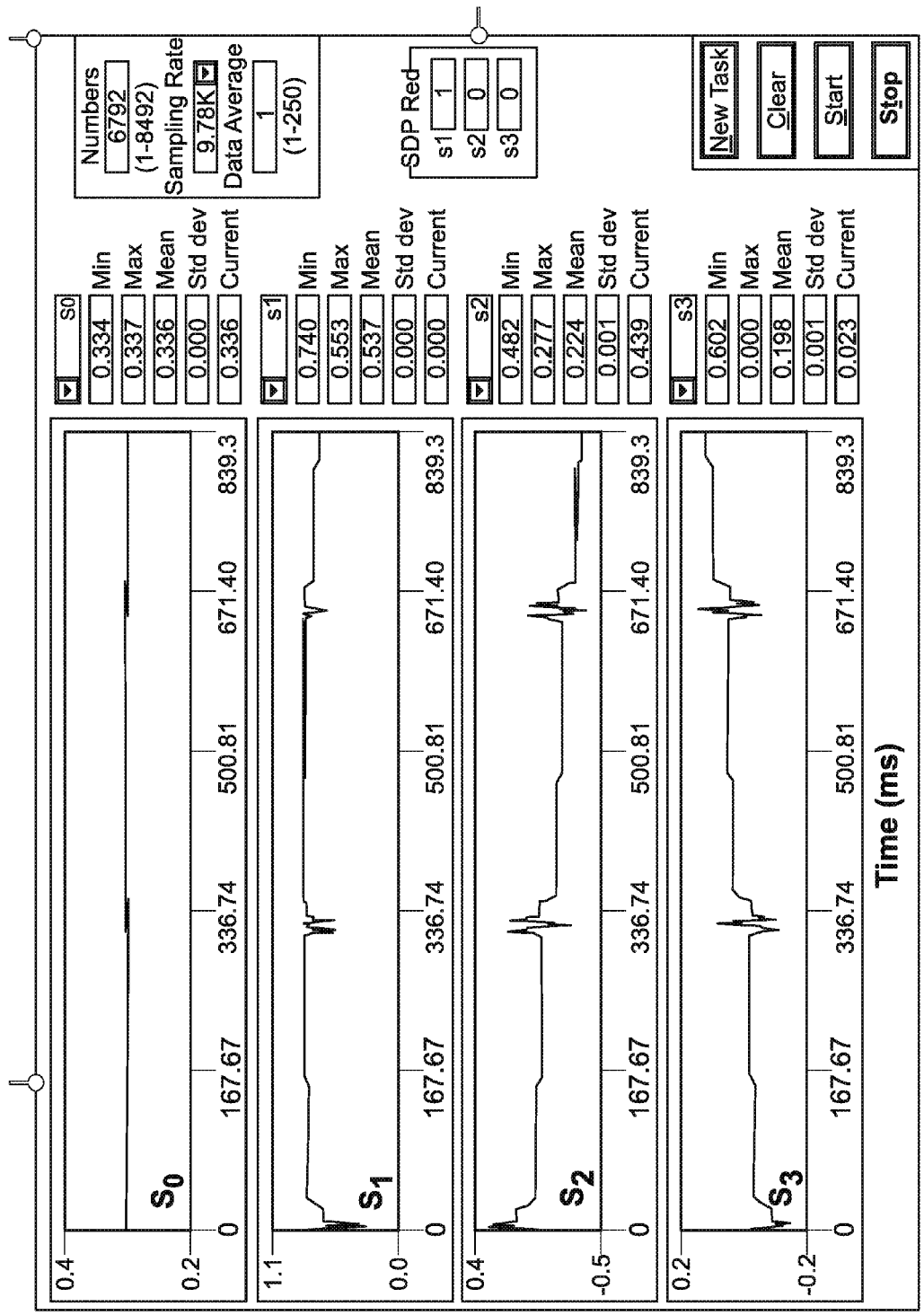
Figure 10:
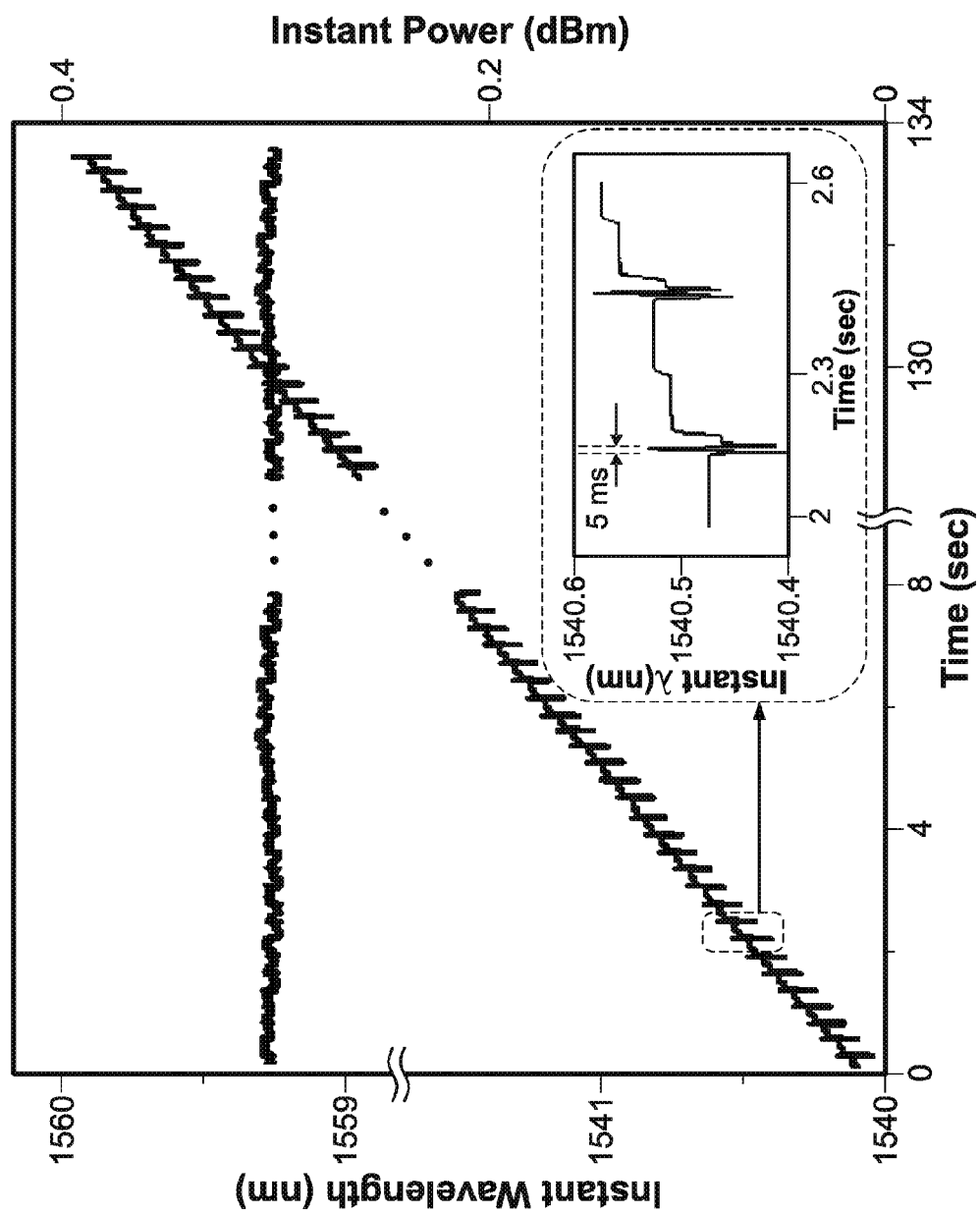
FIG. 10 shows measured instantaneous wavelength and power as the input light source was swept at a speed of 0.1 sec, where the starting wavelength was from the setting of the commercial tunable laser and the transient dynamics of the swept laser source can be clearly revealed as shown in the insert.

FIGS. 9 and 10 show measured results of the swept-wavelength input using HP 8164A. FIG. 9 shows the screen shots of the oscilloscope mode of the POD-101D, where the SOP traces (S0, S1, S2, S3) are recorded. The SOPs reflect both the sinusoidal behaviour when the input HP 8164A light source is swept at a step of 0.05 nm and the spikes in the SOP traces that are caused by stepping the wavelength from one value to the next.

Based on the sampled SOP traces, the recorded SOP data were processed by calculating the accumulated polarization rotation angle, taking into account the direction of the rotation. The polarization rotation angle is translated into the time-resolved swept frequency, as shown in FIG. 10, where the instantaneous wavelength is obtained from 1540 to 1560 nm using the periodic nature of the SOP traces in FIG. 9. The starting wavelength is the setting of the tunable laser and its value is not obtained from the analysis, although the P-OSA is capable of determining the absolute wavelength as described in the next section. Note that the range can be further increased by recording more SOP evolution circles. A zoom-in view of the curve in FIG. 10 shows that a relatively low speed (0.1 second) swept source had a fast transition time on the order of millisecond. This reveals that when the light source is stepped from one wavelength to the next, the light source experiences a fast initialization stage in which the wavelength is oscillating. The light source then quickly jumps to the desired value within several tens of milliseconds. However, most of the time is then used for wavelength locking and stabilization. FIGS. 9 and 10 show that P-OSA exhibits the powerful capability of capturing the transient dynamics of a swept source. This capability can greatly surpass those of the other optical spectrum analyzers. The instantaneous power evolution is also measured from the time-resolved S0 trace.

The direction of the SOP traces can be used to determine the direction of the wavelength change. Referring to FIG. 10, the fast oscillation (on the order of millisecond) occurred during wavelength transitioning can be resolved in terms of the direction of the instantaneous frequency changing, which can be well correlated to the SOP evolutions shown in FIG. 9. This feature is difficult realize in many other optical spectrum analyzers, and can be applied in the field of swept spectral analysis.

Figure 11:
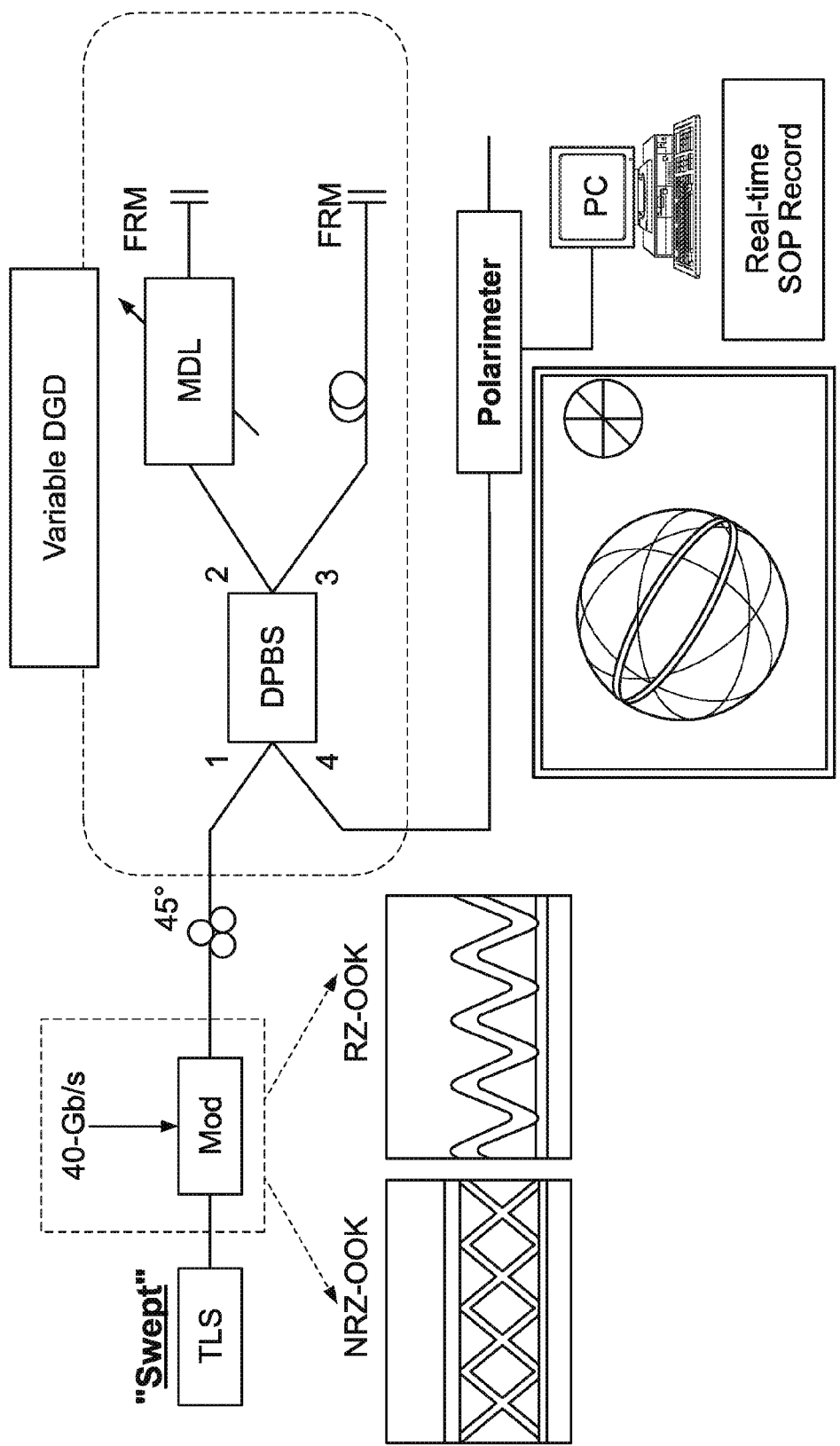
FIG. 11 shows an experimental setup for spectrum analysis of a fixed wavelength source.
Figure 12:
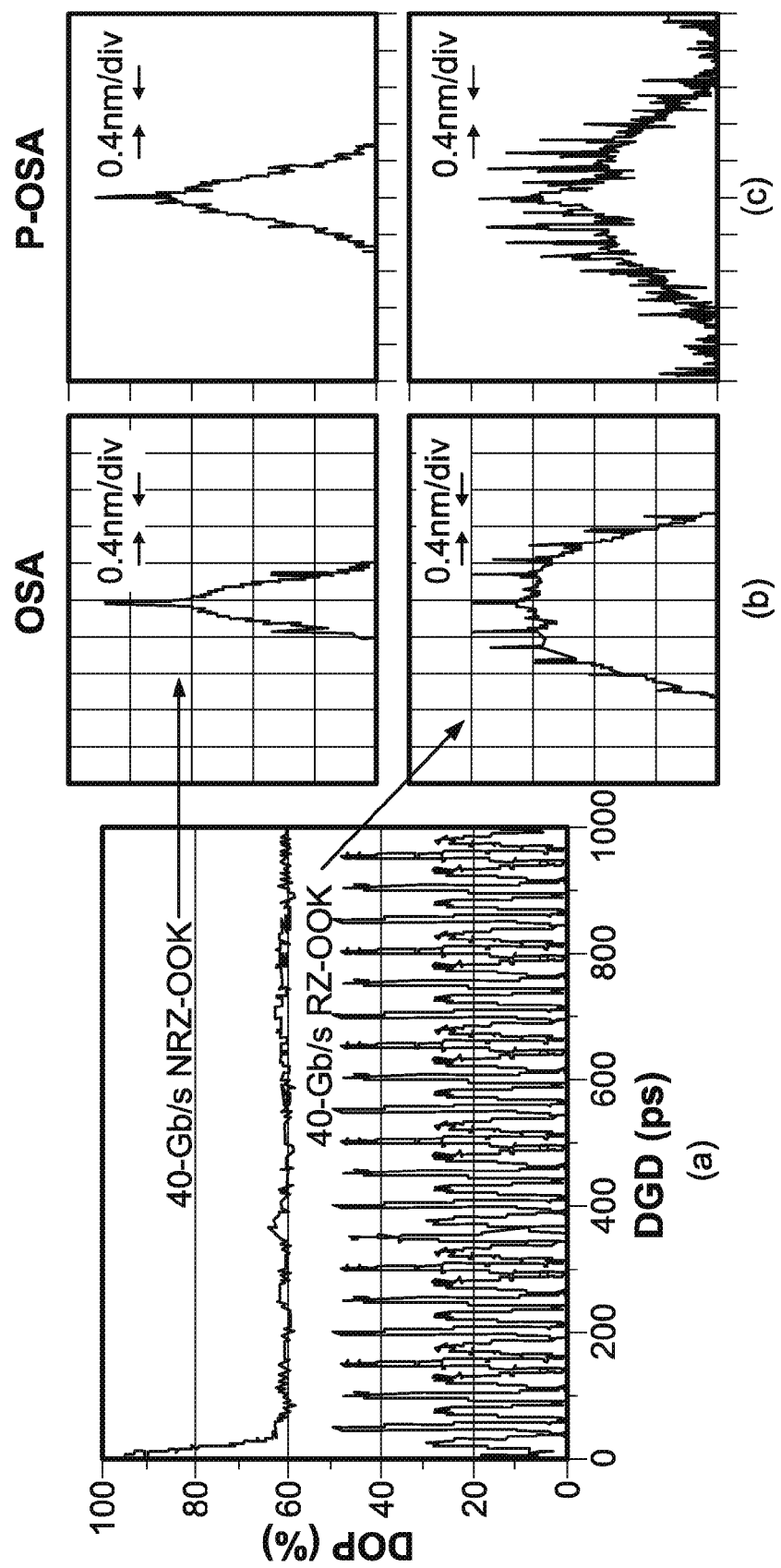
FIG. 12 shows experimental results of DOP values in the setup in FIG. 11 when the DGD was changed from 0 to 1000 ps for both 40-Gb/s NRZ-OOK and RZ-OOK signals, the measured OSA spectra, and the derived spectra.

Measurements for analyzing the spectral shape of a light source were also conducted using the DGD-based optical spectrum analyzer. FIG. 11 shows the experimental setup for the spectrum analysis of a fixed wavelength source. In order to verify the capability of the proposed P-OSA, two spectral features were generated by modulating a narrowband tunable laser using two different on-off-keying (OOK) modulation formats (non-return-to-zero (NRZ) and return-to-zero (RZ)) at 40-Gbit/s. The variable DGD module consists of a 2×2 polarization beam splitter (PBS) for splitting the input light into two orthogonal polarization states (port 1→port 2 and 3) and combining them again at the output (port 2 and 3→port 4). One motorized delay line (MDL), with a tuning range of 560 ps, is inserted in one of the arms. Both arms are path length matched when the MDL is set at its origin. Two Faraday rotating mirror (FRM) are placed at the end of both arms for ensuring polarization orthogonality and stability of the light in the two arms when they recombine at the PBS. The output port of the PBS is directed to the DSP in-line Polarimeter. A polarization controller is placed at the input of the polarimetric interferometer to ensure equal power splitting of the two arms when they recombine at the PBS, and thus the largest SOP circle (shown in the inset) on the Poincare sphere, resulting in the highest frequency resolution FIG. 12 shows measured results of the spectra analysis operation of the setup in FIG. 11. Referring to Part (a) of FIG. 12, DOP of both the 40-Gb/s NRZ-OOK and RZ-OOK were recorded as the MDL values were increased from 0 to 500 ps. This corresponds to 1000 ps DGD tuning range due to the double pass configuration of the experimental setup. The DOP vs. DGD curve shows that the NRZ-OOK curve remains nearly constant around 60% when the DGD is beyond 25 ps, while the RZ-OOK curve exhibits periodic DOP natures due to the fact that it has pronounced 40-GHz tones and some residual 20-GHz tones. By using conventional OSAs, Part (b) of FIG. 12 shows the measured spectra of both NRZ-OOK and RZ-OOK, which exhibits dominant 40-GHz spaced tones and much wider spectrum width. Eqs. (6) and (10) were used to obtain the spectra for the two different formats by processing the rotation angle for the center frequency as well as the DOP curve for the spectral shape and width. Part (c) of FIG. 12 shows the derived spectra using our P-OSA method. For the same horizontal and vertical scales, the P-OSA provides similar spectra width and shapes, with a better spectral resolution due to the 1000-ps DGD tuning range. The 1000-ps DGD tuning range corresponds to a line-width resolution of less than 1 GHz.

The spectral shape and the width of a swept-wavelength light source at each wavelength carry the coherence length information of such a light source that is useful in various applications, including optical coherence tomography (OCT) applications. The spectral shape and the width of a swept-wavelength source at each wavelength are difficult to be directly measured with conventional OSAs. The present P-OSA can be used to directly measure the spectral shape of a fast swept-wavelength source, in addition to the measurement of the spectral shape (power vs. frequency) of a fixed wavelength source. This allows generation of a 3-D plot of the spectral shape of a wavelength-swept light source with feature-rich spectrum as a function of its center wavelength.

In one implementation, both the center wavelength and spectral shape of a wavelength-swept light source can be obtained by repetitive wavelength scans of the wavelength-swept light source while setting the variable DGD device 112 in FIG. 1B at different DGD values. The light from the wavelength-swept light source is directed into the variable DGD device 112 in FIG. 1B to produce output light. The variable DGD device 112 is set at different DGD value. At each DGD value, the wavelength of the wavelength-swept light source is scanned through the full spectral tuning range of the light source or a specified spectral range within the full spectral tuning range. During each scan, the state of polarization (SOP) and the degree of polarization (DOP) for each DGD setting are measured at different time instants measured from the starting of each scan. The measured SOP and DOP change with the wavelength of the light source as the wavelength is scanned. Therefore, at each DGD setting, SOP and DOP are functions of the instant time. Such measurements are repeated for other DGD values. The measured SOP and DOP data for different DGD values at different wavelengths of the light source can be re-arranged to express measured DOP and DOP as functions of DGD at each time instant which corresponds to a specific wavelength during a scan.

Based on the measured SOP and DOP, the center frequency or wavelength of the light source at each time instant can be obtained by curve fitting measured SOP vs. DGD values. The spectrum of the light source is the optical power of the light source as a function of the optical wavelength of the light source and this spectrum at each time instant can be obtained by Fourier transforming the measured DOP values at different DGD values. A 3-D plot of the spectrum of the light source can be expressed as the optical power as a function of the optical wavelength and as a function of the time instant. Next, a 3-D plot of the spectral power as a function of the center wavelength can be obtained from the SOP vs. DGD curve fitting.

Figure 13:
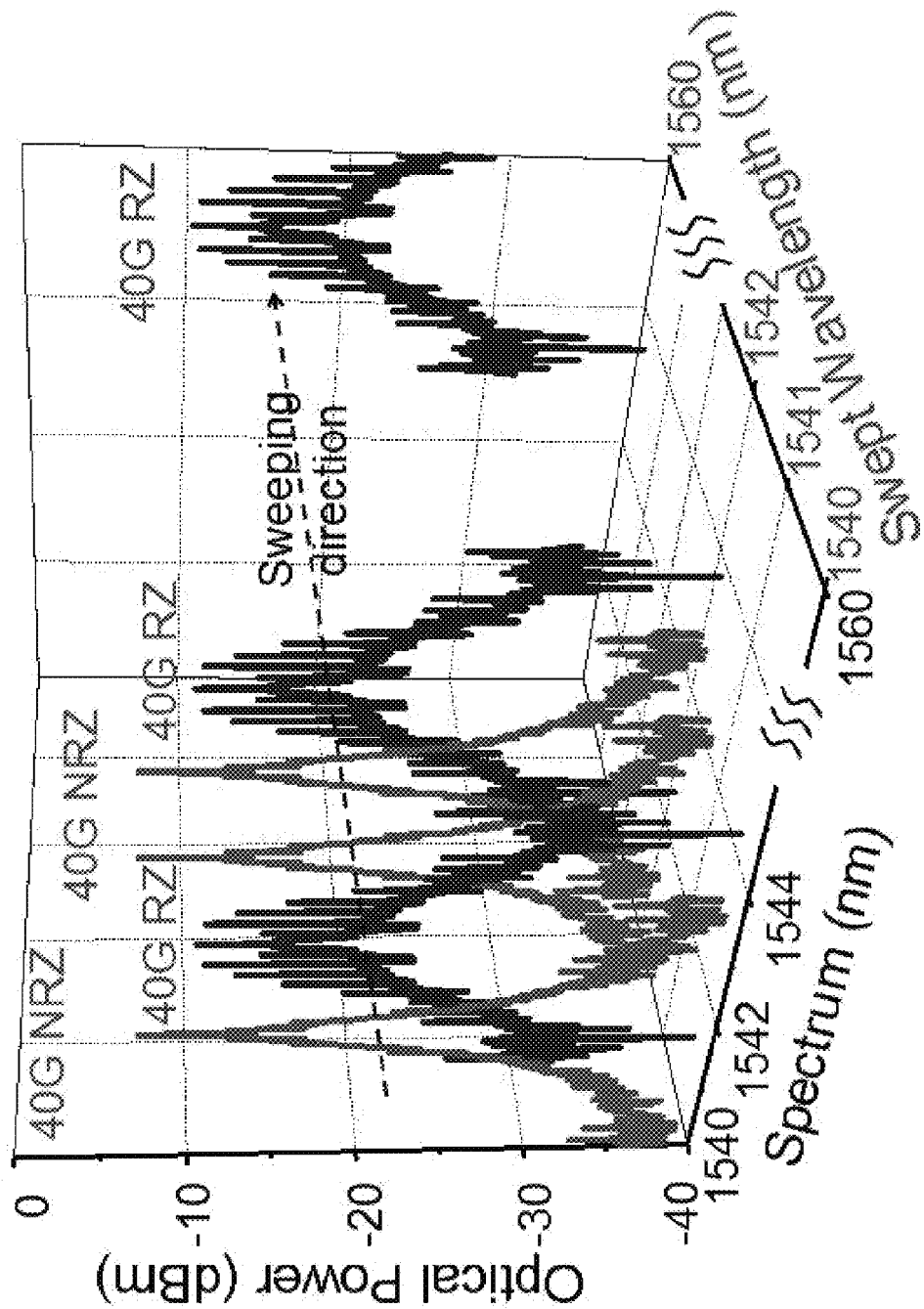
FIG. 13 shows a 3-D display of the optical power with respect to both the optical wavelength and the swept wavelength or time using the present polarimeter-based optical spectrum analyzer.

FIG. 13 shows a 3-D display of the optical power with respect to both the optical wavelength and the swept wavelength or time using the present P-OSA. For the swept-frequency input, every time the variable DGD module was tuned to a specific DGD value, the SOP and DOP information are recorded when the wavelength of the source is swept through the wavelength tuning range of the source. The variable DGD module was gradually tuned from the minimum value to the maximum value to obtain measurements of the whole set of SOP and DOP as two dimensional matrices with respect to both the swept wavelength values and the tuned DGD points. The two dimensional matrices can be arranged to display each spectrum at every swept wavelength using Eqs. (6) and (10). During each wavelength scan (e.g., ranging from 1540 to 1560 nm), the 40-Gb/s NRZ-OOK modulation format or 40-Gb/s RZ-OOK modulation format was generated to obtain feature-rich yet contrasting spectra. The RZ-OOK spectrum shows a better distinguishable and equally spaced carrier tones, as well as a wider spectrum. This capability enables detailed spectral characterization of a fast swept-wavelength source that cannot be obtained with any conventional methods.

As described above, the present polarimeter-based optical spectrum analyzers can be applied to various applications based on spectrum analysis. As one example for such applications, an optical sensing system can be constructed to include a light source to produce probe light, a wavelength-sensitive sensor that receives the probe light and responds to a change at a location or object, e.g., a change in temperature, stress, motion or a material property (such as the material density and optical refractive index) to cause a shift in wavelength of probe light in interaction with the sensor. The probe light from the sensor is directed into a polarimeter-based optical spectrum analyzer (P-OSA) and the shift in frequency is measured to detect the change at the sensor. Notably, the optical spectrum analysis and polarization analysis in the P-OSA can be performed at a high spectral resolution and a high processing speed to enable rapid measurement of a change in wavelength of light (e.g., at a rate more than 100 kHz) to provide a dynamic sensing mechanism and allow for real-time or near real-time sensing.

Figure 14:
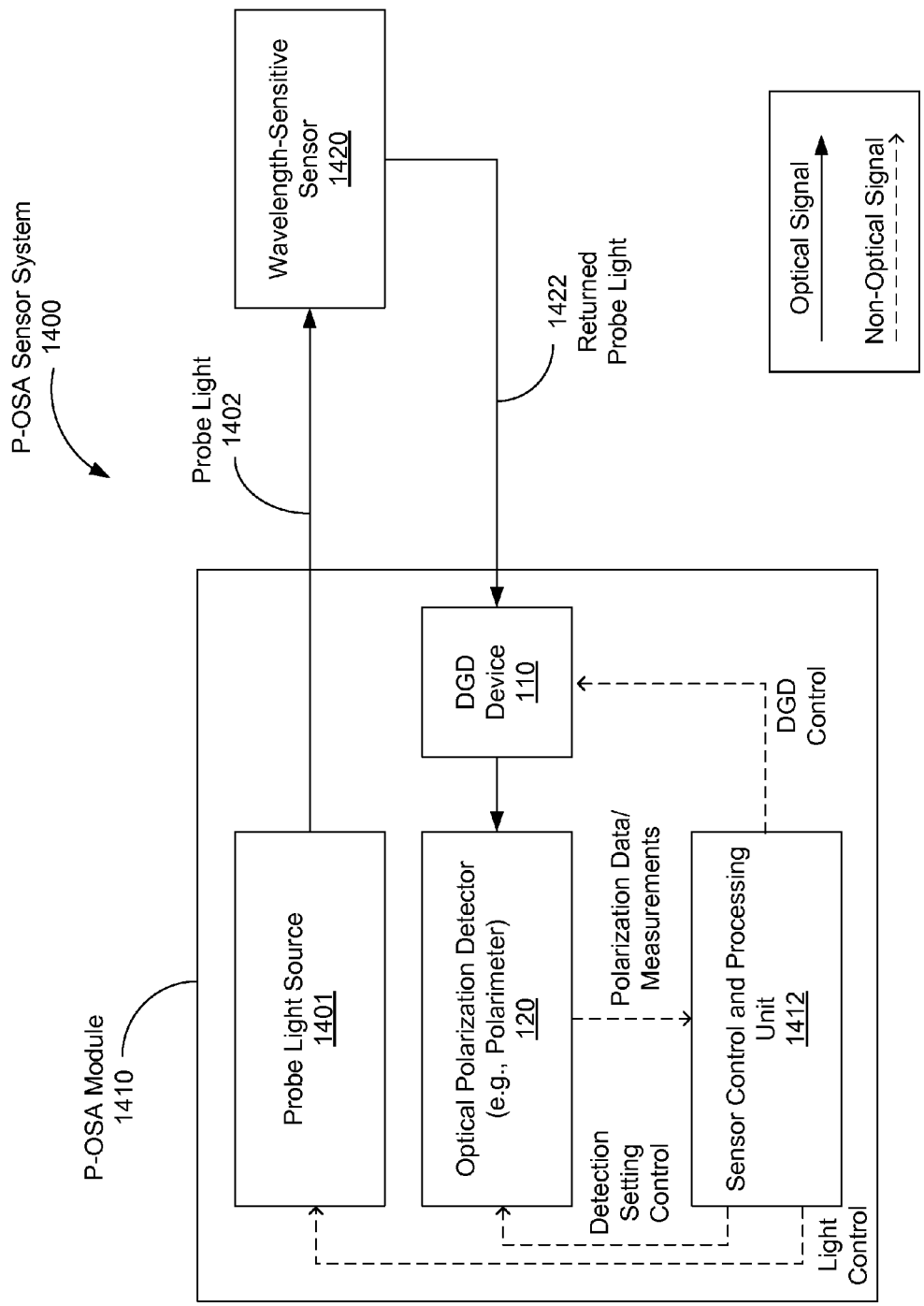
FIG. 14 shows an example of an optical sensing system with a polarimeter-based optical spectrum analyzer and a wavelength-sensitive sensor.

FIG. 14 shows an example of such an optical sensing system 1400 with a P-OSA module 1410 and a wavelength-sensitive sensor 1420. The two units 1410 and 1420 may be located near each other in some application and are separated from each other at other locations such as in remote sensing applications. The sensor 1420 is attached to target object or placed at a target location to perform the sensing. The P-OSA module 1410 produces and directs probe light 1402 to the sensor 1420 and the sensor 1420 interacts with the probe light 1402 to produce returned probe light 1422 whose frequency may be shifted due to the sensor response to a change. The returned probe light 1422 is sent back to the P-OSA module 1410 for measurement based on the polarization analysis. Depending on the specific design of the sensor 1420, the probe light 1402 and the returned probe light 1422 from the sensor 1420 may be directed along a common optical path such as a fiber link or along different optical paths (e.g., two different fiber links).

The P-OSA module 1410 includes a probe light source 1401 that produces the probe light 1402, a P-OSA which can be implemented as the designs in FIG. 1A or 1B and includes a DGD device 110 and a polarimeter 120, and a sensor control and processing unit 1412. The returned probe light 1422 is received at the DGD device 110 and the modified light from the DGD device 110 is fed into the polarimeter 120. The sensor control and processing unit 1412 processes the output from the polarimeter 120 to produce the sensor measurement output. The sensor control and processing unit 1412 can include calibration data of the sensor 1420 that maps shifts in wavelength of the returned probe light 1422 to values of a parameter measured by the sensor 1420. Based on this calibration data, the sensor control and processing unit 1412 can convert a measured shift in frequency of the returned probe light 1422 into the measured parameter value (e.g., temperature or stress). The sensor control and processing unit 1412 may also include control mechanisms for controlling operations of the DGD device 110 when implemented as a variable DGD, the polarimeter 120 and the probe light source 1401. Dashed lines are used to indicate the control signals from the unit 1412.

Figure 15A:
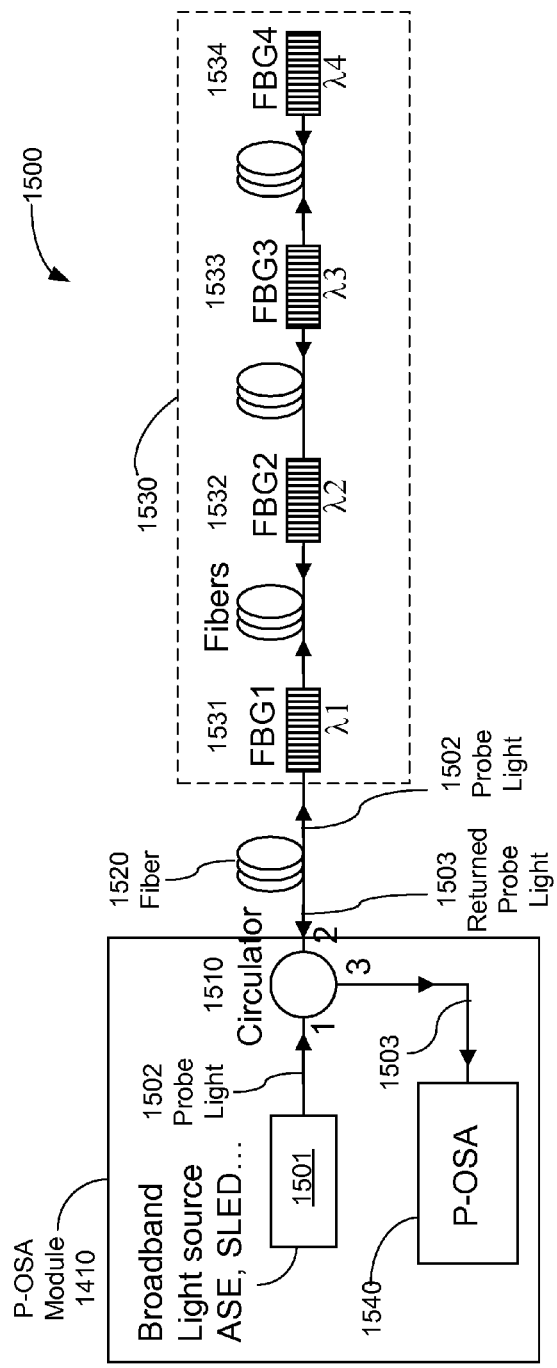
FIGS. 15A and 15B show an example of an optical sensing system with a polarimeter-based optical spectrum analyzer and an array of wavelength-sensitive sensors and the operation of the sensing system.

FIG. 15A shows a sensor interrogator system 1500 as a specific implementation example of the sensor system 1400 in FIG. 14. The system 1500 implements a sensor array 1530 that includes multiple optical sensors 1531, 1532, 1533 and 1534 placed at different locations. A fiber link 1520 is provided to link the P-OSA module 1410 and the sensor array 1530 to guide both the probe light 1502 to the sensor array 1530 and the returned probe light 1503 from the sensor array 1530. These optical sensors 1531, 1532, 1533 and 1534 are configured to operate at different designated wavelengths $\lambda 1$, $\lambda 2$, $\lambda 3$ and $\lambda 4$, respectively. Each optical sensor only responds to a change to shift a frequency of light at its designated wavelength within an operating bandwidth and does not interact with light at other designed wavelengths. Therefore, the different designated wavelengths $\lambda 1$, $\lambda 2$, $\lambda 3$ and $\lambda 4$ have a one-to-one mapping relationship with the different optical sensors 1531, 1532, 1533 and 1534. Accordingly, light at a particular designated wavelength carries only information from a designed optical sensor. The P-OSA module 1410 can detect frequency shifts at different designed wavelengths to extract sensor measurements at different optical sensors carried by the returned probe light 1503. This wavelength-encoding mechanism allows a single P-OSA device to be used for conducting measurements in multiple optical sensors.

In this example, a single fiber link 1520 is provided to link the optical sensors in series to guide both the probe light 1502 to the optical sensors 1531, 1532, 1533 and 1534 and the returned probe light 1503 from the optical sensors 1531, 1532, 1533 and 1534. In other implementations, two or more optical fiber links may be used to link the optical sensors in a more complex topology, e.g., a two-dimension network of optical sensors, where the routing of the probe light 1502 to different sensors and the routing of the returned probe light from different sensors can be achieved with more complex optical routing designs.

The P-OSA module 1410 in FIG. 15A includes a probe light source 1501 that produces the probe light 1502 with a broad spectral bandwidth covering the designated optical wavelengths λ1, λ2, λ3 and λ4. An amplified spontaneous emission (ASE) broadband light source or a superluminescent light emitting diode (SLED), for example, can be used as the probe light source 1501. A P-OSA 1540 is provided to measure the returned light with an operating spectral range covering at least the designated optical wavelengths λ1, λ2, λ3 and λ4. Because a single fiber link 1520 is used to guide both the probe light 1502 to the sensor array 1530 and the returned probe light 1503 from the sensor array 1530, a 3-port optical circulator 1510 is provided to properly guide the probe light 1502 from its port 1 to the port 2 connected to the fiber link 1520 and the returned probe light 1503 received at the port 2 to the port 3 connected to the P-OSA 1540 so that the returned the probe light 1503 is directed into the P-OSA 1540 without entering the light source 1501.

Figure 15B:
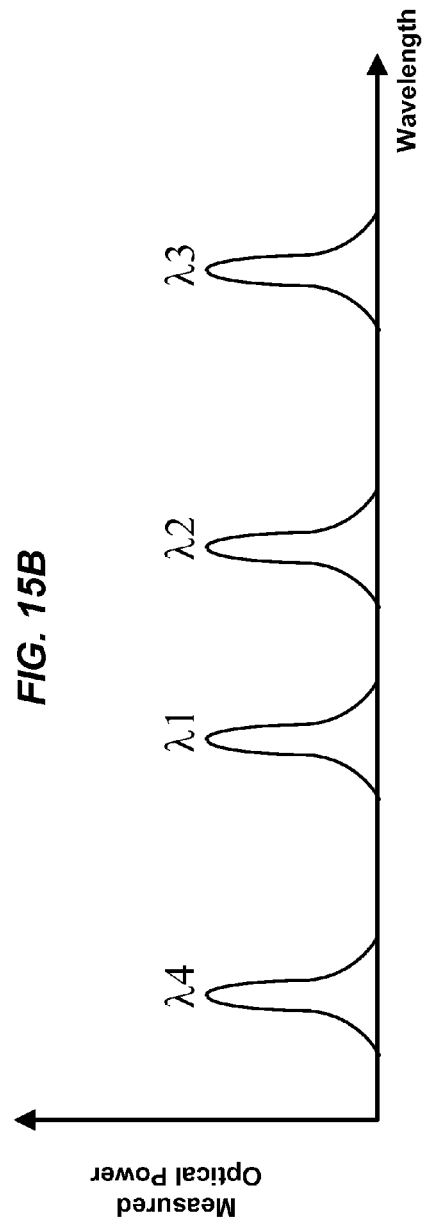

More specifically in the example in FIG. 15A, the optical sensors 1531, 1532, 1533 and 1534 are fiber Bragg Gratings (FBGs) structured to have their reflection resonances at the designated optical wavelengths λ1, λ2, λ3 and λ4, respectively. Hence, each FBG sensor operates to interact and reflect light at or near its designated optical wavelength within the bandwidth of the FBG sensor while transmitting light at other wavelengths. For example, the FBG optical sensor 1531 reflects light in the probe light 1502 at its designated wavelength the λ1 while transmitting light at λ2, λ3 and λ4. When the FBG optical sensor 1531 experiences a change in temperature or stress that causes a shift in the its reflection resonance wavelength from its the designated optical wavelengths λ1 at a pre-set temperature or stress, the reflected light produced by the FBG optical sensor 1531 carries the information of this shift. Different FBG optical sensors respectively reflect light at their resonance wavelengths so that the returned probe light 1503 from the sensor array 1530 is a collection of different reflected light signals by the different FBG optical sensors 1531, 1532, 1533 and 1534. The spectrum of the reflected probe light 1503 is shown in FIG. 15B where spectral peaks represent the reflected signals from the FBG optical sensors 1531, 1532, 1533 and 1534 at or around the designated optical wavelengths λ1, λ2, λ3 and λ4, respectively. A change between the measured reflected resonance peak and the initial designated optical wavelength for a FBG optical sensor is measured to determine a change in temperature or stress at the FBG optical sensor.

The above use of a broadband light source as the probe light source 1501 sends light at all designed sensor wavelengths in the probe light 1502 to interact and interrogate all FBG optical sensors 1531, 1532, 1533 and 1534. This design allows the sensor system 1500 to measure changes at different sensor locations to obtain a spatial map of the measures.

In an alternative implementation, the probe light source 1501 can be a tunable single-wavelength laser that produces the probe light 1502 at a single wavelength which can be at any one of the designated wavelengths of the FBG optical sensors 1531, 1532, 1533 and 1534 in the sensor array 1530. Under this implementation, the single-wavelength probe light 1502 interacts with and thus interrogate one FBG optical sensor at a time and the tunable single-wavelength laser 1501 is tuned to interrogate different FBG optical sensors at different times, one sensor at a time.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Only a few implementations are disclosed. Variations and enhancements of the described implementations and other implementations can be made based on what is described and illustrated in this document.

What is claimed is:

1. A method for measuring spectrum of light, comprising:
   directing light under measurement through a differential group delay (DGD) device to produce output light with a DGD value representing a difference in the group delay between two orthogonal optical polarizations of the light under measurement;
   measuring optical polarization and a degree of polarization of the output light corresponding to the DGD value; and
   processing the measured optical polarization and degree of polarization for the output light to produce an optical spectrum of the light under measurement;
   wherein the DGD device comprises:
   a polarization beam splitter to split the light under measurement into a first optical beam in a first optical polarization along a first optical path and a second optical beam along a second, different optical path in a second optical polarization that is orthogonal to the first optical polarization;
   a first Faraday reflector in the first optical path to reflect light in the first optical path back towards the polarization beam splitter;
   a second Faraday reflector in the second optical path to reflect light in the second optical path back towards the polarization beam splitter; and
   a delay mechanism that changes a relative optical path difference between the first and second optical paths to produce the DGD values;
   wherein the polarization beam splitter combines reflected light in the first optical path in the second optical polarization and reflected light in the second optical path in the first optical polarization to produce a combined output beam as the output light.

2. A method for measuring spectrum of light, comprising:
   directing light under measurement through a differential group delay (DGD) device to produce output light with a DGD value representing a difference in the group delay between two orthogonal optical polarizations of the light under measurement;
   measuring optical polarization and a degree of polarization of the output light corresponding to the DGD value;
   processing the measured optical polarization and degree of polarization for the output light to produce an optical spectrum of the light under measurement;

placing an optical sensor at a target location that interacts with light at a resonance wavelength of the optical sensor and responds to a parameter to change the resonance wavelength of the optical sensor;

directing probe light to the optical sensor to interact with the optical sensor to produce returned probe light at the resonance wavelength of the optical sensor associated with the parameter;

directing the returned probe light as the light under measurement into the DGD device; and processing the optical spectrum of the returned probe light to extract information on the parameter.

3. A method for measuring spectrum of light, comprising:

directing light under measurement through a differential group delay (DGD) device to produce output light with a DGD value representing a difference in the group delay between two orthogonal optical polarizations of the light under measurement;

measuring optical polarization and a degree of polarization of the output light corresponding to the DGD value;

processing the measured optical polarization and degree of polarization for the output light to produce an optical spectrum of the light under measurement;

placing optical sensors at different target locations, the optical sensors interacting with light at different resonance wavelengths, respectively, each responding to a parameter to change a respective resonance wavelength of the optical sensor;

directing probe light to the optical sensors to interact with the optical sensors to produce returned probe light comprising light from the optical sensors caused by interaction with the probe light at the different resonance wavelengths of the optical sensors associated with the parameter;

directing the returned probe light as the light under measurement into the DGD device; and processing the optical spectrum of the returned probe light to extract information on the parameter at each of the optical sensors.

4. A device for measuring spectrum of light, comprising:

a differential group delay (DGD) device positioned to receive light under measurement and to produce output light with a DGD value representing a difference in the group delay between two orthogonal optical polarizations of the light under measurement;

an optical detector positioned to receive the output light from the DGD device to measure a state of polarization and a degree of polarization of the output light; and a processing device that receives and processes measurements of the state of polarization and the degree of polarization from the optical detector to produce a spectrum of the light under measurement;

wherein the DGD device comprises:

a polarization beam splitter to split the light under measurement into a first optical beam in a first optical polarization along a first optical path and a second optical beam along a second, different optical path in a second optical polarization that is orthogonal to the first optical polarization;

a first Faraday reflector in the first optical path to reflect light in the first optical path back towards the polarization beam splitter;

a second Faraday reflector in the second optical path to reflect light in the second optical path back towards the polarization beam splitter; and a delay mechanism that changes a relative optical path difference between the first and second optical paths to produce the DGD values;

wherein the polarization beam splitter combines reflected light in the first optical path in the second optical polarization and reflected light in the second optical path in the first optical polarization to produce a combined output beam as the output light.

5. A device for measuring spectrum of light, comprising:

a differential group delay (DGD) device positioned to receive light under measurement and to produce output light with a DGD value representing a difference in the group delay between two orthogonal optical polarizations of the light under measurement;

an optical detector positioned to receive the output light from the DGD device to measure a state of polarization and a degree of polarization of the output light;

a processing device that receives and processes measurements of the state of polarization and the degree of polarization from the optical detector to produce a spectrum of the light under measurement; wherein the DGD device comprises:

an optical polarization beam splitter (PBS) having a first port, a second port and a third port, wherein light at a first optical polarization transmits through the PBS between the first port and the second port, and light at a second optical polarization orthogonal to the first optical polarization that enters at either of the second port and the third port is reflected to the other of the second port and the third port;

a first optical path having a first end optically coupled to the second port of the PBS to receive light from the second port and to direct light to the second port;

a polarization reflector coupled to a second end of the first optical path to reflect light received from the first optical path back to the first optical path with a reflected optical polarization that is orthogonal to a polarization of the light that initially enters the first optical path upon exiting the second port of the PBS;

a second optical path having a first end optically coupled to the third port of the PBS to receive light from the second port and to direct light to the third port; and a reflector coupled to a second end of the second optical path to reflect light received from the second optical path back to the second optical path with a reflected optical polarization that is the same as an optical polarization of the light at the third port when entering the second optical path.

6. The device as in claim 5, wherein, in the DGD device, the polarization reflector is a Faraday reflector coupled to a second end of the first optical path to reflect light received from the first optical path back to the first optical path with a reflected optical polarization that is, at each location along the first optical path, orthogonal to an optical polarization of the light when traveling in the first optical path from the PBS towards the Faraday reflector prior to the reflection.

7. The device as in claim 5, wherein, in the DGD device, the polarization reflector comprises a reflector and a quarter wave plate whose one of two orthogonal principal polarization axes is at 45 degrees with a polarization axis of light exiting the second port of the PBS, and wherein the quarter wave plate is located between the PBS and the reflector.

8. A device for measuring spectrum of light, comprising:

a differential group delay (DGD) device positioned to receive light under measurement and to produce output light with a DGD value representing a difference in the group delay between two orthogonal optical polarizations of the light under measurement;

an optical detector positioned to receive the output light from the DGD device to measure a state of polarization and a degree of polarization of the output light;

a processing device that receives and processes measurements of the state of polarization and the degree of polarization from the optical detector to produce a spectrum of the light under measurement;

a probe light source that produces probe light;

an optical sensor at a target location that receives the probe light and interacts with the probe light at a resonance wavelength of the optical sensor, the optical sensor responding to a parameter to change the resonance wavelength of the optical sensor and to produce returned probe light at the resonance wavelength of the optical sensor associated with the parameter, wherein the returned probe light is directed into the DGD device as the light under measurement; and a processing unit that processes the optical spectrum of the returned probe light to extract information on the parameter.

9. A device for measuring spectrum of light, comprising:

a differential group delay (DGD) device positioned to receive light under measurement and to produce output light with a DGD value representing a difference in the group delay between two orthogonal optical polarizations of the light under measurement;

an optical detector positioned to receive the output light from the DGD device to measure a state of polarization and a degree of polarization of the output light;

a processing device that receives and processes measurements of the state of polarization and the degree of polarization from the optical detector to produce a spectrum of the light under measurement;

a probe light source to produce probe light;

optical sensors at different target locations, the optical sensors interacting with light at different resonance wavelengths, respectively, each responding to a parameter to change a respective resonance wavelength of the optical sensor, the optical sensors receiving and interacting with the probe light to produce returned probe light comprising light from the optical sensors caused by interaction with the probe light at the different resonance wavelengths of the optical sensors associated with the parameter, wherein the returned probe light is directed into the DGD device as the light under measurement; and a processing unit processing the optical spectrum of the returned probe light to extract information on the parameter at each of the optical sensors.

10. The device as in claim 9, wherein each optical sensor includes a fiber Bragg grating sensor.

11. A method for measuring optical spectral property of light, comprising:

directing light under measurement to pass through a differential group delay (DGD) device to cause a delay between two orthogonal states of polarization of the light under measurement to produce output light;

measuring a state of polarization of the output light;

processing the measured state of polarization to determine an increase or decrease in frequency of the light under measurement based on a change in the measured state of polarization;

using a wavelength-swept light source to generate the light under measurement;

controlling the DGD device to produce different DGD values on the output light;

at each DGD value, scanning a wavelength of the wavelength-swept light source in a spectral range within a scanning time period to measure values of a state of polarization (SOP) and a degree of polarization (DOP) of the output light at different time instants in the scanning time period;

processing measured SOP and DOP values at each time instant for different DGD values to obtain a center optical frequency or wavelength of the wavelength-swept light source at each time instant;

obtaining a spectral power, which is optical power as a function of the optical wavelength, of the light source at each time instant by Fourier transforming measured DOP values vs. DGD values; and obtaining a 3-D plot of the optical power as a function of the time instant and as a function of the optical wavelength.

12. The method as in claim 11, further comprising:

converting the 3-D plot into a 3-D plot of the optical power as a function of the center wavelength based on the processing of the measured SOP and DOP values at each time instant for different DGD values as a function of the optical wavelength.

* * * * *

UNITED STATES PATENT AND TRADEMARK OFFICE
CERTIFICATE OF CORRECTION

PATENT NO. : 8,345,238 B2
APPLICATION NO. : 12/351294
DATED : January 1, 2013
INVENTOR(S) : Xiaotian Steve Yao It is certified that error appears in the above-identified patent and that said Letters Patent is hereby corrected as shown below:

In the Specifications:

In Column 8, Line 58, in Equation (1), please delete "$\vec{E} = (E_x e^{i2\pi f \tau} \hat{e}_x + E_y \hat{e}_y) e^{i\phi_o}$," and insert -- $\vec{E} = (E_x e^{i2\pi f \tau} \hat{e}_x + E_y \hat{e}_y) e^{i\phi_o}$ --, therefor.

In Column 9, Line 41, in Equation (5), please delete "$\sigma f =$" and insert -- $\delta f =$ --, therefor.

In Column 14, Line 17, please delete "103" and insert -- 503 --, therefor.

In Column 14, Line 44, please delete "140" and insert -- 540 --, therefor.

In Column 14, Line 48, please delete "rotator 530" and insert -- rotator 531 --, therefor.

In Column 14, Line 50, please delete "103" and insert -- 503 --, therefor.

In Column 15, Lines 2-3, please delete "rotator 530." and insert -- rotator 531. --, therefor.

In Column 15, Line 5, please delete "103" and insert -- 503 --, therefor.

In Column 15, Line 6, please delete "140 where the a" and insert -- 540 where the --, therefor.

In Column 15, Line 41, please delete "140." and insert -- 540. --, therefor.

In Column 15, Line 44, please delete "110" and insert -- 510 --, therefor.

In Column 15, Line 45, please delete "rotator 130" and insert -- rotator 531 --, therefor.

In Column 15, Line 56, please delete "103" and insert -- 503 --, therefor.

Signed and Sealed this
Twentieth Day of August, 2013

Teresa Stanek Rea
*Acting Director of the United States Patent and Trademark Office*

CERTIFICATE OF CORRECTION (continued)
U.S. Pat. No. 8,345,238 B2

In Column 16, Line 2, please delete "301" and insert -- 601 --, therefor.

In Column 16, Line 3, please delete "103" and insert -- 503 --, therefor.